US007634296B2

(12) United States Patent
Haeusel

(10) Patent No.: US 7,634,296 B2
(45) Date of Patent: Dec. 15, 2009

(54) SET TOP BOX WITH MOBILE PHONE INTERFACE

(75) Inventor: Fred C. Haeusel, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 581 days.

(21) Appl. No.: 11/294,885

(22) Filed: Dec. 2, 2005

(65) Prior Publication Data

US 2007/0130592 A1 Jun. 7, 2007

(51) Int. Cl.
*H04B 1/38* (2006.01)

(52) U.S. Cl. ........................... 455/557; 725/37; 725/39; 725/60; 725/62

(58) Field of Classification Search ....... 455/3.01-3.06, 455/557; 725/39, 37, 60, 62, 81-82
See application file for complete search history.

(56) References Cited

U.S. PATENT DOCUMENTS 6,658,268 B1 12/2003 Bodnar et al.
7,194,756 B2 * 3/2007 Addington et al. .......... 725/116
2004/0039648 A1 * 2/2004 Candelore et al. ............. 705/26
2004/0224638 A1 11/2004 Fadell et al.
2005/0077870 A1 * 4/2005 Ha et al. ..................... 320/114

OTHER PUBLICATIONS

Block, Ryan, "Say-hello-to-the-Motorola-e790-Apple-iTunes-phone", http://www.engadget.com, posted Jul. 3, 2005, pp. 1-13.

* cited by examiner

*Primary Examiner*—Raymond S Dean
(74) *Attorney, Agent, or Firm*—Stewart M. Wiener

(57) ABSTRACT

A set top box includes a mobile phone receiving bay disposed in a housing of the set top box. The receiving bay includes a device connector coupled to circuitry in the set top box and a receiving bay opening that is arranged to provide access to the device connector. The device connector is configured for removable engagement with an accessory connector disposed in a mobile phone. The device connector and accessory connector are coupled when the mobile phone is docked in the receiving bay in the set top box to thereby provide a communication interface between the set top box and mobile telephone that enables data transmission therethrough. Users interact with an electronic program guide hosted by the set top box to download media content such a music, ring tones and video to the mobile phone from a network source coupled to the set top box.

6 Claims, 32 Drawing Sheets

FIG 4
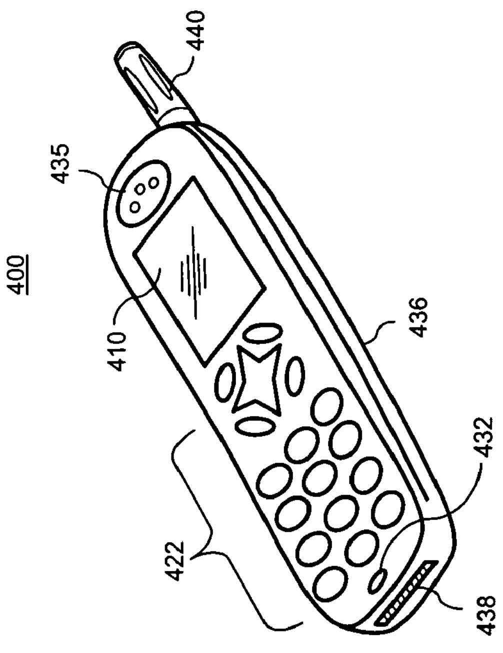
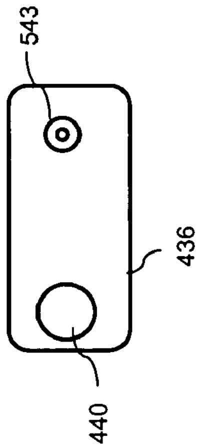
FIG 5
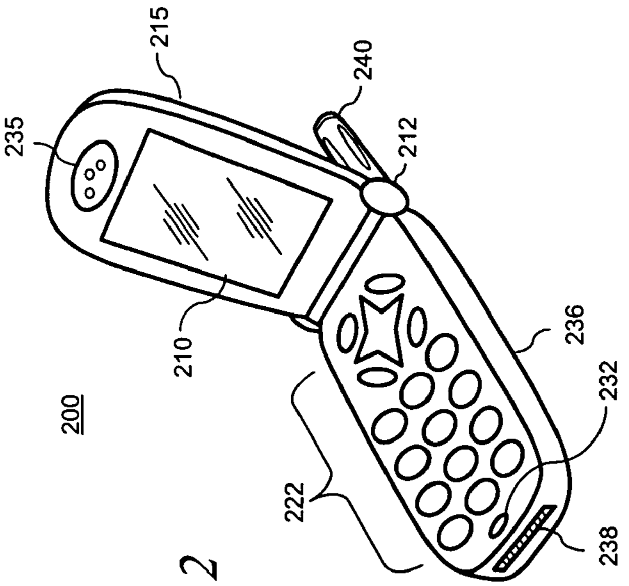
FIG 2
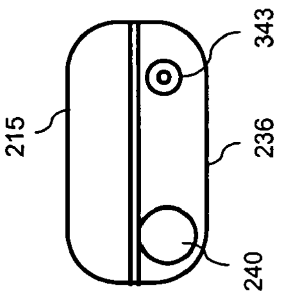
FIG 3

3600

3700

SET TOP BOX WITH MOBILE PHONE INTERFACE

BACKGROUND

Mobile phones are commonly being configured by manufacturers with functionalities beyond voice communication. Mobile phones are often integrated with digital cameras, text messaging, organization features such as phone books, calendars, and more recently, video viewing capabilities. Another recent trend is to arrange mobile phones as audio playback devices for the wide variety of customized ring tones that are available for download on the Internet. Mobile phones are also increasingly used as music players for the popular MP3 (MPEG-1 audio layer 3 where MPEG stands for "Moving Picture Experts Group") and other forms of digital music. Mobile phones with integrated music players are expected to become increasing competitive, on a worldwide scale, with purpose-built music players such as Apple Computer's popular iPod® brand of digital music player.

According to recent studies, almost 20 percent of phone owners worldwide now listen to music on their phones. More than a third of mobile phone users globally are expected to choose mobile music as one of the five applications they would like to start using, or use more of in the future, according to the studies. While this trend bodes well for mobile music and increased mobile phone sales in general, several obstacles stand in the way of more widespread adoption of mobile phones with integrated music players. Aside from commercial issues such as the pricing of digital music downloads, addressing the technical and user interface issues associated with downloading music to mobile phones will encourage more people to listen to music on their mobile phones. For example, the relatively small display size of mobile phones (which can reduce the ease of interaction with a music download applications and services), lack of convenient input device beyond the small mobile phone buttons, and the drain on the phone's battery when downloading are several among many prohibitive factors to be overcome before mobile phones can gain more widespread acceptance as music players.

BRIEF DESCRIPTION OF THE DRAWINGS

FIG. 2 is a simplified pictorial representation of a flip-style mobile phone incorporating an audio player and an accessory connector;

FIG. 3 is top view of the mobile phone shown in FIG. 1;

FIG. 4 is a simplified pictorial representation of a non-flip-style mobile phone incorporating an audio player and an accessory connector;

FIG. 5 is a top view of the mobile phone shown in FIG. 4;

DETAILED DESCRIPTION

Many of the hurdles associated with the use of mobile phones as music and audio players are overcome by an arrangement where a set top box ("STB") provides a convenient and powerful interface between the mobile phone and media content services. Users can walk into their home and plug (i.e., "dock") their mobile phone into their STB. By interacting with an electronic programming guide ("EPG") displayed on a television coupled to the STB, users connect to media content services such as electronic storefronts or virtual shopping to browse, select and then purchase and/or download media content such as music to their mobile phones through the STB. While docked to the STB, the mobile phone's battery is also recharged. Notably, the mobile phone used in such an arrangement needs no modifications or alterations.

Figure 1:
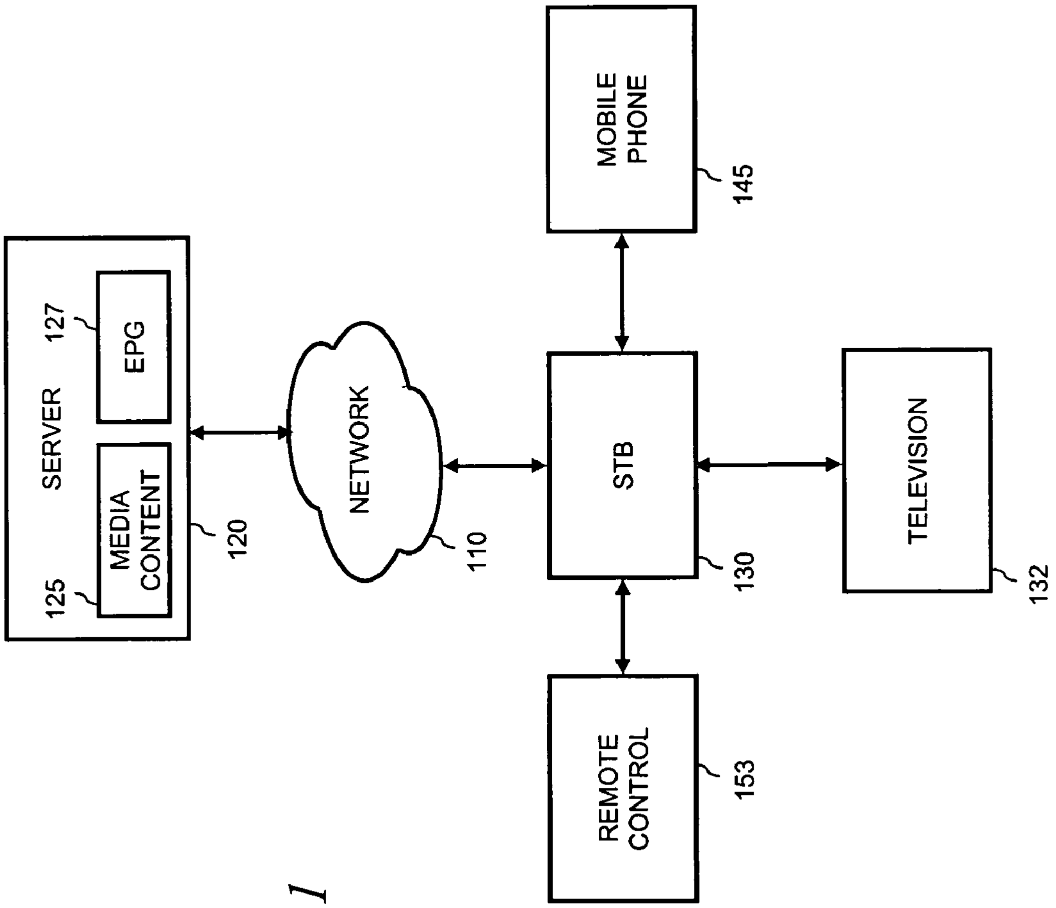
FIG. 1 is block diagram of a client-server arrangement incorporating a server, a set top box ("STB"), remote control, mobile telephone and television.

As shown in FIG. 1, a network 110 is used to couple a server 120 to a STB 130. In an illustrative arrangement the network 110 is a cable television network such as co-axial cable or hybrid fiber co-ax network. Alternative networks include satellite networks, telephone networks, data networks including local-, metropolitan-, and wide-area-networks (LANs, MANs, and WANs, respectively), and distributed networks such as the Internet. The server 120 provides media content 125 over the network 110 to the STB 130 which displays the media content 125 on the coupled television 132. Media content 125 is typically delivered in digital format and includes television programming such as broadcast programming, pay-per-view ("PPV") and video-on-demand ("VOD"). In this illustrative arrangement media content 125 from server 120 includes audio content including digital music. In addition, electronic shopping is provided where users can purchase and download music to their mobile phones much as they do movies and other programming with PPV or VOD applications for their televisions. In many settings, server 120 is located at a network head-end that is maintained by network provider such as cable television provider. Alternatively, server 120 is maintained by a service provider that uses network 110 for access and data transport, but does not operate network 110.

Server 120 also provides an EPG 127 to STB 130 over network 110. An EPG is an on-screen guide hosted by the STB 130 on television 132 allowing a user to navigate, select, and discover media content by time, title, channel, genre, media type (television, VOD, music) etc., using remote control 153 that interoperates with STB 130. Server 120 supplies digital data making up the EPG to an application that typically resides within a middleware application in the STB 130 that enables EPG 127 to be displayed. Data for EPG 127 is usually sent within the broadcast transport stream or alongside it in a special data channel. For example data for EPG 127 may be transported as described by the Advanced Television Systems Committee ("ATSC") PSIP (Program and System Information Protocol) standard. In analog implementations, data for EPG 127 is included in the analog television signal, for example in the vertical blanking interval.

Typical elements of EPG 127 comprise a graphical user interface which enables the display of information pertaining to the media content. EPGs are often constructed using a series of hierarchical menus that provide a variety of choices on each screen that a user may select using the remote control. Information is typically displayed on a grid and users may use arrow keys and buttons on the remote control to move from field to field on the menu to get information and makes selections.

In the case of television, EPGs generally provide descriptive information such as a synopsis, actors, directors, year of production and so on, the channel name and the programs on offer from subchannels such as PPV and VOD services, program start times, genres and other descriptive metadata. For music, EPGs can provide displays of artist, album and track title information, among other descriptive information. For electronic storefronts, EPG displays often vary considerably. However, in many applications the user interface is similar to that used with VOD and PPV applications where media content purchases have an established history.

FIG. 2 is a simplified pictorial representation of an illustrative mobile telephone 200. The term "mobile phone" generally refers to portable telephone devices using wireless radio wave transmission technology. In an illustrative example of a set top box with a mobile phone receiving bay as described in detail herein, the mobile phone 200 is arranged with multiple functionalities beyond voice telephony. Mobile phone 200 is representative of current trends in mobile phone technology by supporting a variety of media types including stereo audio such as MP3 and AAC (Advanced Audio Coding) formatted music, video capture and display, still picture capture and display and data services such as short message service ("SMS"), email and Internet browsing. Accordingly, mobile phone 200 includes the necessary hardware, software and firmware used to implement the functionalities described above.

Mobile phone 200 is commonly referred to as a "flip phone" because the display screen 210 pivots on hinge 212 so that the mobile phone 200 folds compactly. When folded, the mobile phone's cover 215 protects the screen 210 from damage and the keys 222 from being inadvertently depressed when the mobile phone is not in use. To make or answer a call, the mobile phone 200 is "flipped" open to access the keys 222 as well as microphone 232 and speaker 235. As shown in FIG. 2, keys 222 and microphone 232 are disposed along the body 236 of mobile phone 200.

An accessory connector 238 is typically positioned along one of the surfaces of the mobile phone, in this case along the bottom portion of mobile phone 200. The accessory connector 238 is commonly used to connect mobile phones to external accessories. Such accessories include, for example, speakers, data cables, chargers, hands-free car kits, and the like. Mobile phone 200 is also equipped with a small external antenna 240 as is common with many mobile phone designs. In this illustrative example, accessory connector 238 is used to operatively couple with a corresponding connector disposed in a mobile phone receiving bay of a STB to facilitate a connection between the mobile phone and media content services so as to enable the STB to perform as a downloading gateway between the mobile phone and the media content provider.

FIG. 3 is a top view of mobile phone 300. A jack 343 is disposed along the top portion of the body 236 of mobile phone 200 along with antenna 230. Jack 343, in this illustrative example, is a stereo audio jack which is designed to engage with a plug of a stereo headset (not shown) such as the common 2.5 or 3.5 mm mobile phone plugs. In some application, audio jack 343 is configured as a three channel jack so that an external microphone may be used in addition to supporting stereo audio output.

Some mobile phones are equipped with wireless I/O (input/output) to support audio output and microphone input. Bluetooth is one common example of a wireless radio frequency ("RF") communication feature that enables users to use wireless microphones and headsets with their mobile phones, among other accessories or peripheral devices. Other common wireless formats include Institute of Electrical and Electronic Engineers, IEEE 802.11, ultra wideband wireless ("UWB"), magnetic and infrared ("IR") links. Sometimes wireless communication is used to connect a mobile phone with other mobile phones, personal digital assistant type devices, to exchange data such as phone or address book data.

Coupled to the jack 343 and disposed within the body 236 of mobile phone 200 is a media player (not shown) that provides for, among other functions, music to be played on mobile phone 200. In this illustrative example, music is encoded in the AAC, although other common encoding formats may also be used depending on the specific requirements of an application. For example, MP3, WAV, WMA (Windows Media Audio), AIFF (Audio Interchange File Format), MPEG-4 and other lossy or lossless data encoding formats are all usable known formats. The media player in mobile phone 200 typically includes an audio codec and storage (such as Flash memory) for audio files, in this case AAC encoded music files.

FIG. 4 is a simplified pictorial representation of another illustrative mobile phone 400. Mobile phone 400 is an example of a non-flip-type phone in common use which is often called a "candy bar" style phone. Aside from the form factor, mobile phone 400 shares the functions and features of mobile phone 200, as described above. In mobile phone 400, screen 410, keys 422, microphone 432 and speaker 435 are all incorporated into body 436. Mobile phone 400 also includes an accessory connector 438 and antenna 440. Mobile phone 400 further includes a jack 543 disposed along a top portion of body 436 as shown in FIG. 5. The elements shown in FIGS. 4 and 5 are the same as their counterparts shown in FIGS. 2 and 3 and described in the accompanying text.

Figure 6:
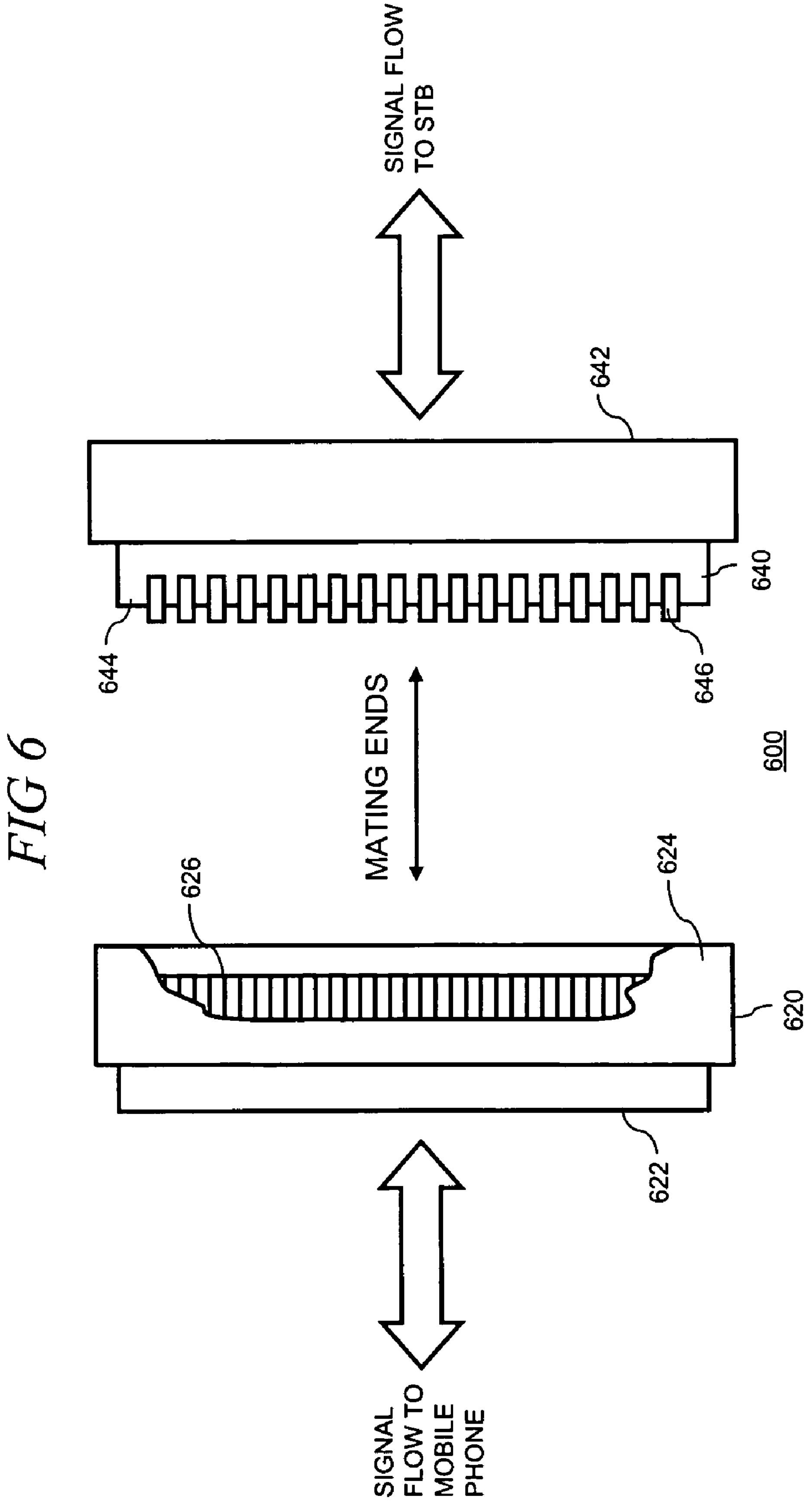
FIG. 6 is a simplified diagram of an accessory and device connector arrangement used to connect a mobile phone to a STB.

FIG. 6 is a simplified diagram of an illustrative accessory connector arrangement 600 used to connect a mobile phone to a STB. The connector arrangement 600 comprises two mating connectors. The mobile phone's accessory connector 620 has a circuit end 622 that is arranged to be coupled to electrical circuits in a mobile phone, including for example, battery circuitry and I/O control circuitry. Accessory connector 620 has mating end 624 that is arranged to mate with a corresponding device connector 640. Device connector 640 has a mating end 644 and a circuit end 642 that is arranged to be coupled to electrical circuitry in a STB, including for example an I/O interface in the STB.

The connector arrangement 600 used to connect a mobile phone and STB may be widely varied. Thus, the physical form factor, connector count and configuration of connector arrangement is a typically a matter of design choice for the specific application involved. However, in this illustrative example, connector arrangement 600 includes both power and data contacts. Accessory connector 620 includes a set of contacts 626 which are arranged to engage with corresponding and mating contacts 646 in device connector 640. Accordingly, individual contacts in contact set 626 of accessory connector 620 used for power transmission are operatively coupled to battery circuitry in the mobile phone. Individual contacts in contact set 626 used for data transmission are operatively coupled to the mobile phone's I/O controller circuitry. In addition, then, the power and data contacts in contact set 626 are configured to engage with corresponding contacts in contact set 646 in device connector 640 so as to provide operational or charging power and data transmission between the mobile phone and STB when the connectors 620 and 640 are mateably engaged.

Figure 7:
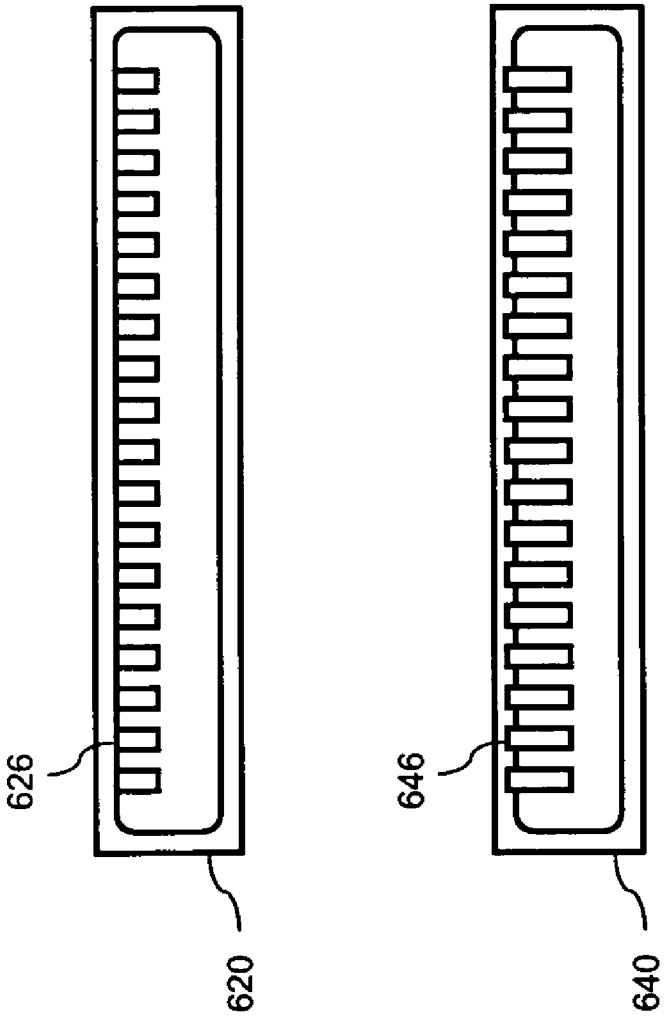
FIG. 7 shows front views of the connectors shown in FIG. 6.

In the illustrative example shown in FIGS. 6 and 7, the contact set 646 in device connector 640 protrude for insertion into the corresponding contacts 626 that are recessed within connector 620 (i.e., a "male" to "female" connection). In some applications, contact set 646 and connector 640 are arranged to snugly fit (i.e., a "friction-fit") with contact set 626 and connector 620 to hold the connector arrangement 600 together. Alternatively, connectors 620 and 640 may include a locking mechanism for positively locking the connectors together. For example, a latch on a portion of one connector that engages and disengages with a portion of the other connector may be used in some applications.

The arrangement of contacts in connector arrangement 600 may also be widely varied. For example, data transmission functionalities including USB (Universal Serial Bus), USB 2, IEEE-1394 (commonly called "Firewire") and other data transmission standards are selected to meet specific requirements. Functionalities may be mixed and combined as well in some applications so that some contacts in the contact sets are dedicated to USB signals while others are dedicated to Firewire signals. Conventional signals including grounding, charging, powering, signaling protocols, device or accessory identification and similar signals may also be carried across the contacts sets. Accordingly, the number of contacts and their physical configuration will vary according to the specific requirements of an application.

Figure 8:
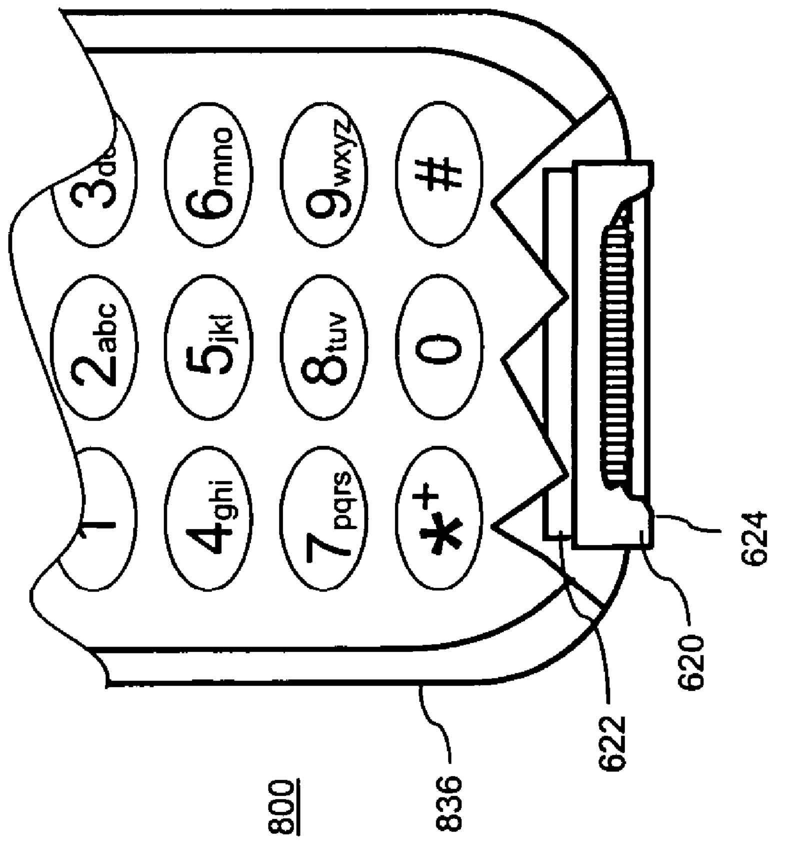
FIG. 8 shows a cutaway view of an accessory connector disposed within the body of a mobile phone.

FIG. 8 is a cutaway view of an accessory connector 620 that is disposed within the body 836 of an illustrative mobile phone 800. The accessory connector in this example is positioned in the body 836 so that the circuit end 622 is available to circuitry contained internally within mobile phone 800. The mating end 624 is positioned so that it is exposed on an external surface (in this example, the bottom portion of mobile phone 800) to thereby facilitate mateable engagement with a respective corresponding device connector. One example of an accessory connector suitable for many applications is the connector from the "iDEN" brand family of products produced by Motorola®, and more specifically part number 0985678E02.

Figure 9:
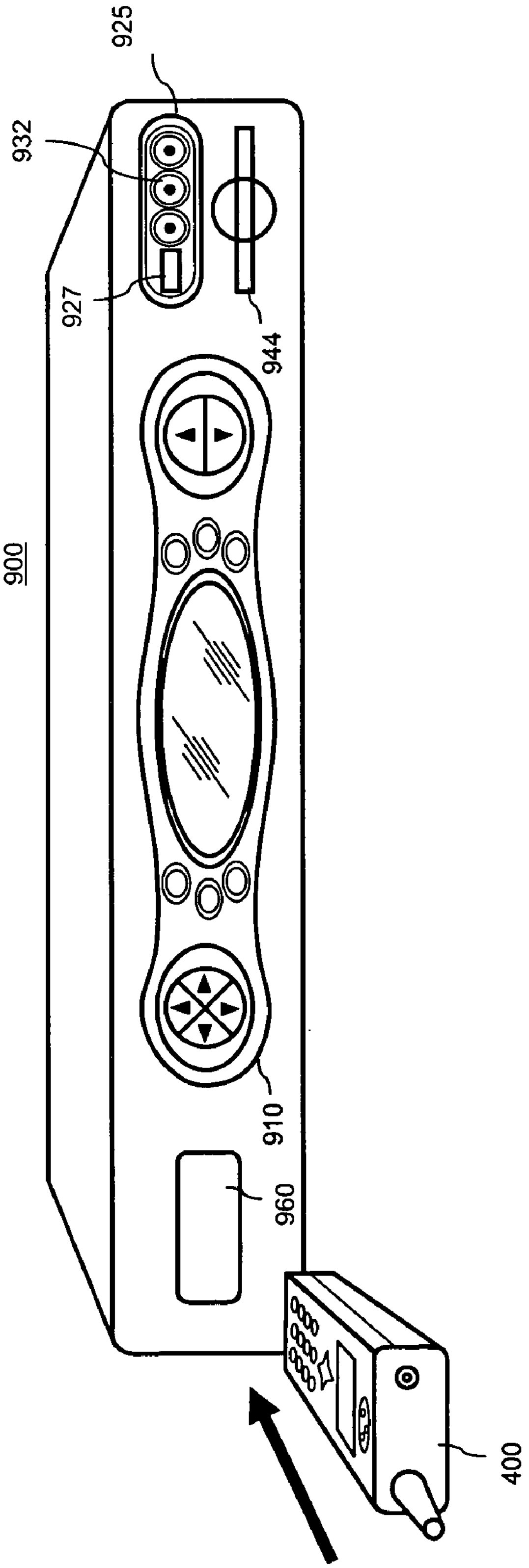
FIG. 9 is a simplified pictorial representation of an illustrative STB having a mobile phone receiving bay with an opening in the front.

FIG. 9 is a simplified pictorial view of an illustrative STB 900 having a mobile phone receiving bay 960 that is substantially disposed within the interior housing of STB 900 and having an opening in the front surface (i.e., front panel) of the STB. STB 900 is typically arranged as a client in a client-server architecture and coupled to a remote server over a network, for example as shown in FIG. 1. STB 900 receives digital signals including media content from a media content provider. The media content includes video, music, and other data as noted above.

STB 900 is representative of current STB technology. STBs are specialized electronic devices that process information, generally in digital format. STBs typically function as a gateway between a user's television or personal computer and telephone, satellite, terrestrial or cable networks. STBs accept commands from a user (generally through use of a handheld remote control, keypad, voice recognition unit or keyboard) and transmit these commands back upstream to the network head end, through a back channel (which may be a separate phone line in some cases.)

Today's STBs can make it possible to receive television signals, connect to and browse networks such as the Internet, play games via a game console (which might be built-in to the STB) browse networks including the Internet, interact with EPGs, virtual channels, electronic storefronts and walled gardens (i.e., websites that are preselected by the service provider), send e-mail, and engage in videoconferencing. Many STBs are further able to communicate in real time with devices such as camcorders, and consumer electronic devices such DVD (digital versatile disc) and CD (compact disc) players and music keyboards. Other STBs include hard disk drives, built in digital video recorders, and smart card slots to verify, for example, user identities during on-line electronic transactions.

STBs commonly support digital rights management ("DRM") systems. In typical DRM applications, media content is wrapped at the server and made accessible by a DRM client at the STB in accordance with that client's rights. Such systems are often used to ensure that the digital media content is not inappropriately widely distributed by a user who has access to the media through the STB.

The illustrative STB shown in FIG. 9 includes a front panel display 910 with operating controls, an I/O panel 925 including a front panel data connector 927 and three audio/video jacks 932. STB 900 also includes a smart card slot 944.

Figure 10:
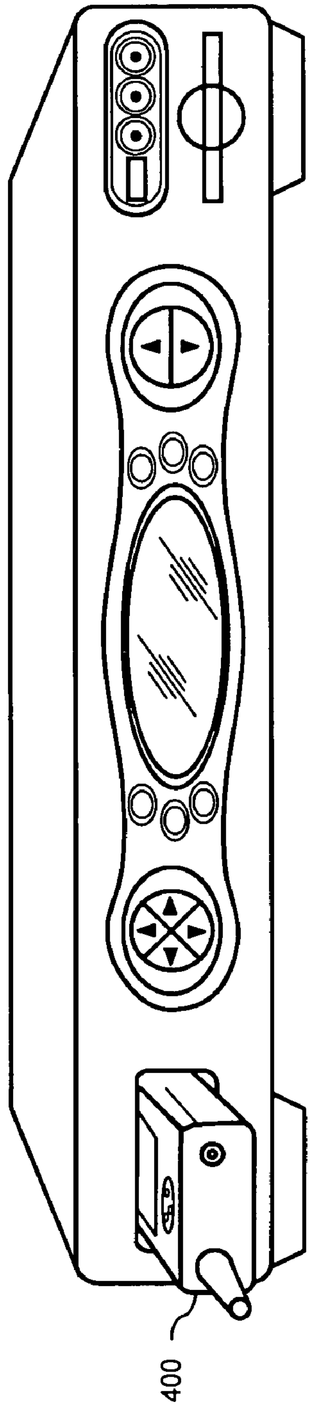
FIG. 10 is a simplified pictorial representation of an illustrative STB having a phone receiving bay with an opening in the front with a mobile phone inserted therethrough.

STB 900 includes a mobile phone receiving bay 960 that is disposed within the interior volume housed by STB 900. In this illustrative example, the mobile phone receiving bay 960 has an opening that is located on the front surface (i.e., front panel) of STB 900 as shown in FIG. 9. The mobile phone receiving bay is configured to physically receive a mobile phone, in this case a non-flip (i.e., candy bar-style) phone 400. That is, mobile phone 400 may be inserted into the mobile phone receiving bay 960 as shown in FIG. 10. It is noted that flip-type mobile phones, such as mobile phone 200 (FIG. 2) may also be accommodated in the mobile phone receiving bay of a STB as described in more detail below.

Figure 11:
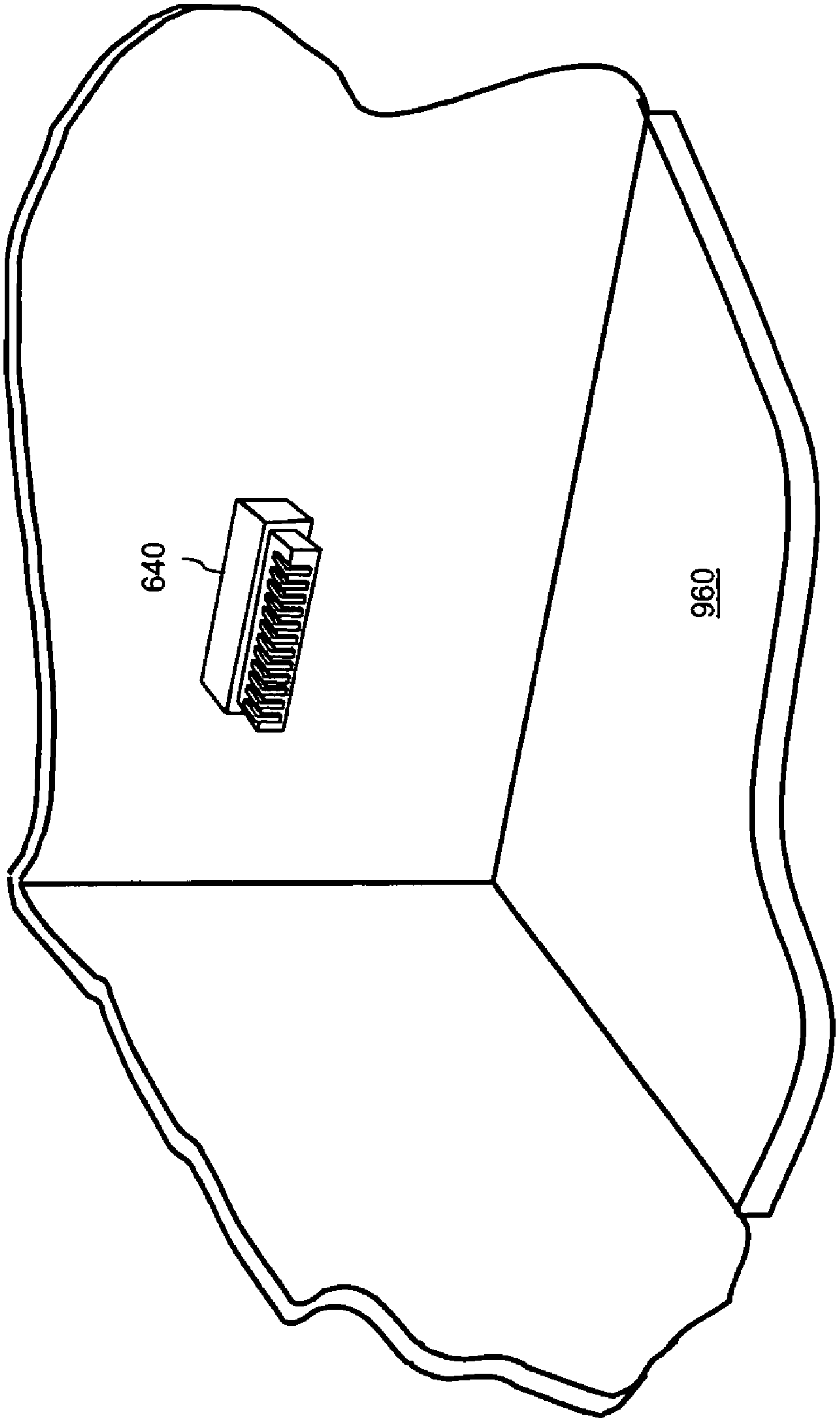
FIG. 11 shows an enlarged interior perspective view of an illustrative mobile phone receiving bay.

Mobile phone receiving bay 960 includes device connector 640 as shown in FIGS. 6 and 7 as described in the accompanying text. FIG. 11 is an enlarged interior perspective view of the mobile phone receiving bay 960 which is disposed in STB 900 showing device connector 640 disposed on the rear end portion of the receiving bay 960 which is spaced apart from and opposes the mobile phone receiving bay opening (not shown). Device connector 640 is operatively coupled to various components, for example an I/O interface, in the STB 900 as described below.

Figure 12:
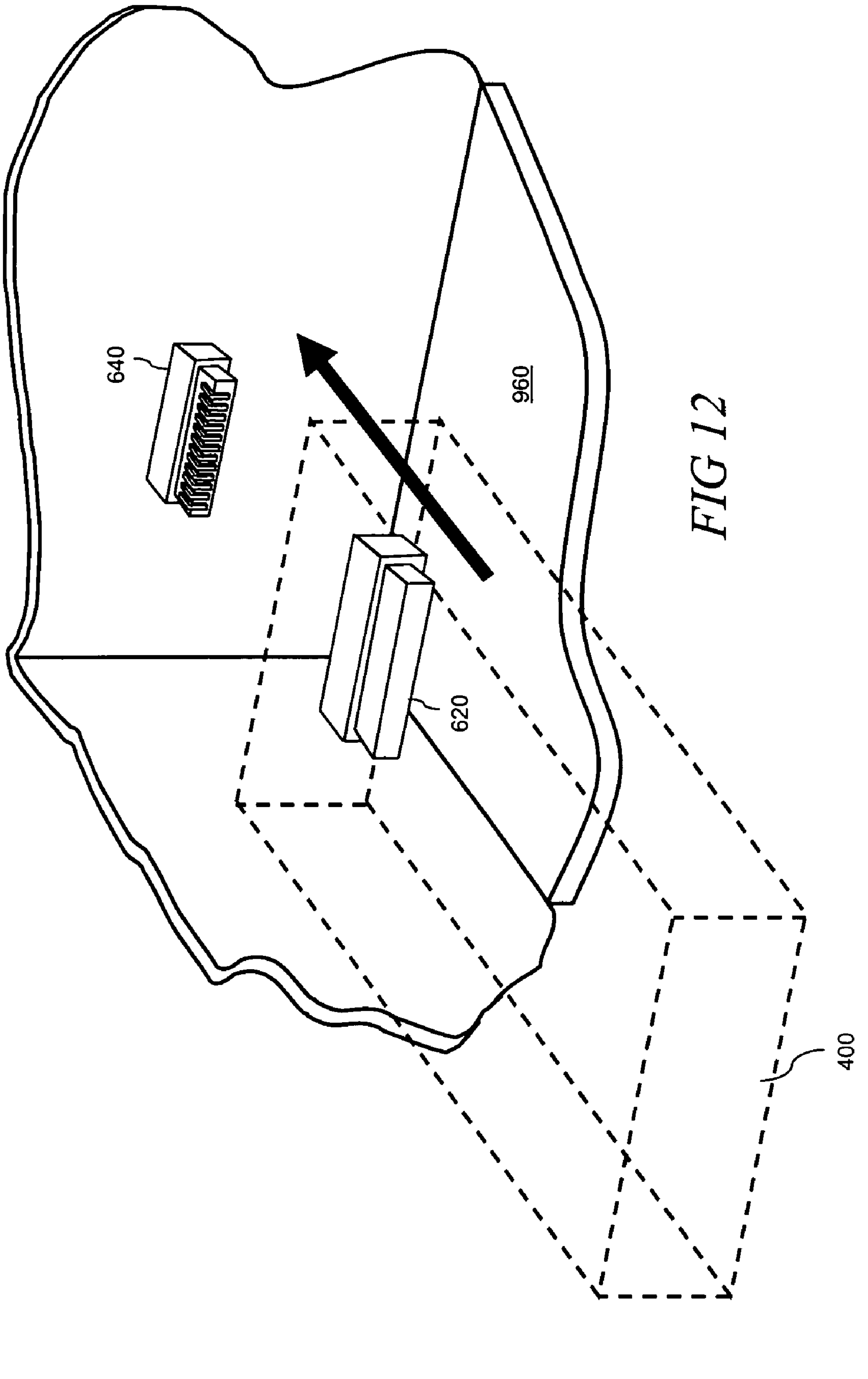
FIG. 12 shows an enlarged interior perspective view of an illustrative phone receiving bay showing the connectors in an operative relationship before being mateably engaged.
Figure 13:
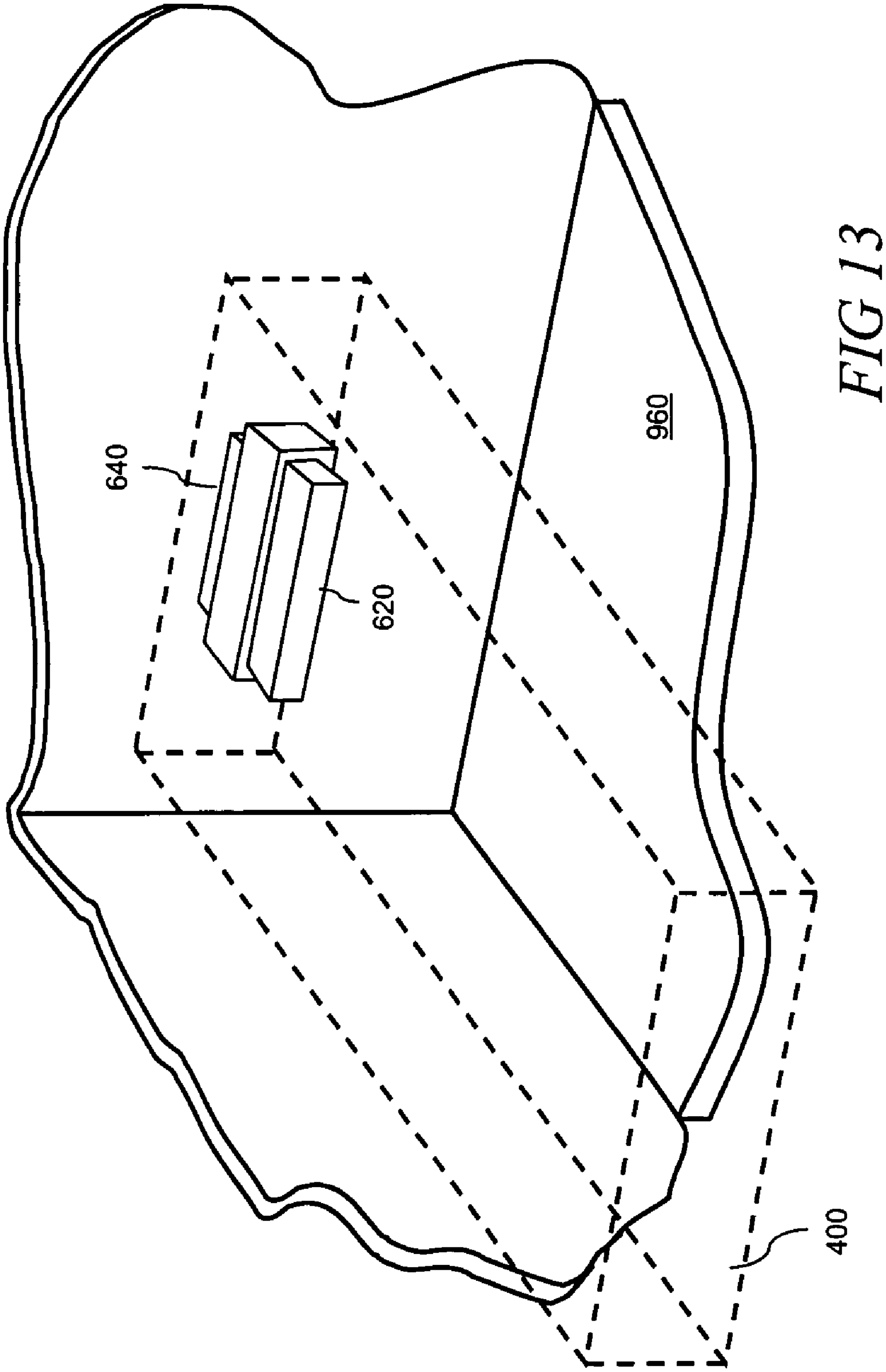
FIG. 13 shows an enlarged interior perspective view of an illustrative phone receiving bay showing the connectors in an operative relationship after being mateably engaged.

As illustrated in FIG. 12, mobile phone 400 (shown in phantom lines only for sake of clarity in illustration) having accessory connector 620 disposed along its bottom surface is inserted through the opening in the front panel of the STB 900. Mobile phone 400 is pushed rearwardly into the mobile phone bay receiving bay 960 until the connector 620 is operatively received and mateably engaged with the device connector 640 as shown in FIG. 13.

Optionally, STB 900 is arranged with a visual or audible indicator, for example a light or buzzer respectively, to signal to a user that a positive operative connection was made between the mobile phone and STB. Such a signal can be helpful positive feedback to the user that the STB "sees" the mobile phone (i.e., recognizes that it is connected to the STB) particularly as the device connector 640 is not always located in a position that is easily visible to the user in every application. In addition to a discrete indicator on the STB 900, existing visual or audible indicating devices in the STB are alternatively used, for example the panel display 910, or an internal speaker if the STB is so equipped. In other applications, the STB is arranged to display connection status with a docked mobile phone through a user interface such as EPG displayed on a television. Optionally, the STB and mobile phone may be arranged so that the mobile phone displays a message or icon which indicates that a positive docking connection has been accomplished.

Figure 14:
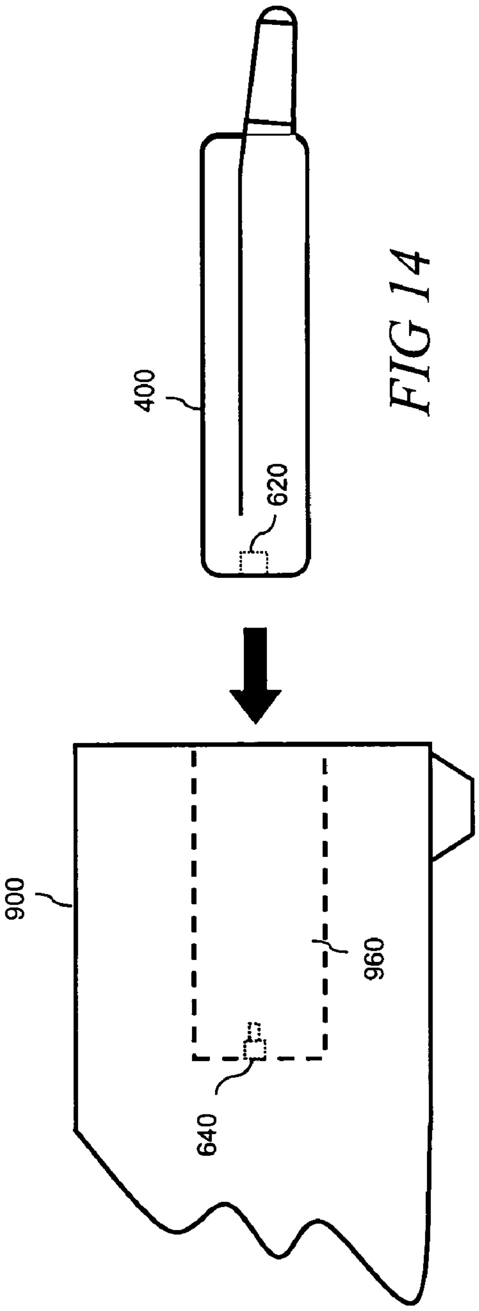
FIG. 14 is a side view of an illustrative STB with a mobile phone receiving bay having an opening in the front surface of the STB.
Figure 15:
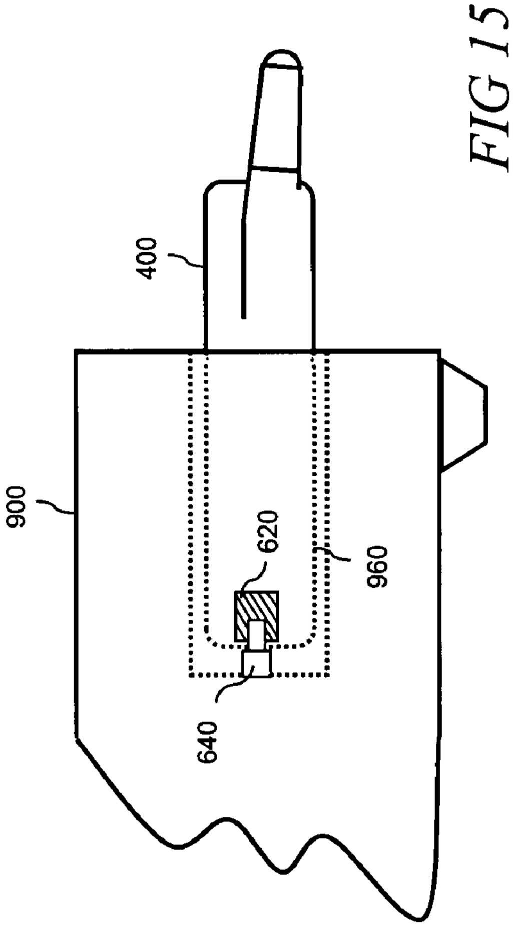
FIG. 15 is a side view of an illustrative STB with a mobile phone receiving bay having an opening in the front surface of the STB with a mobile phone inserted therethrough.
Figure 16:
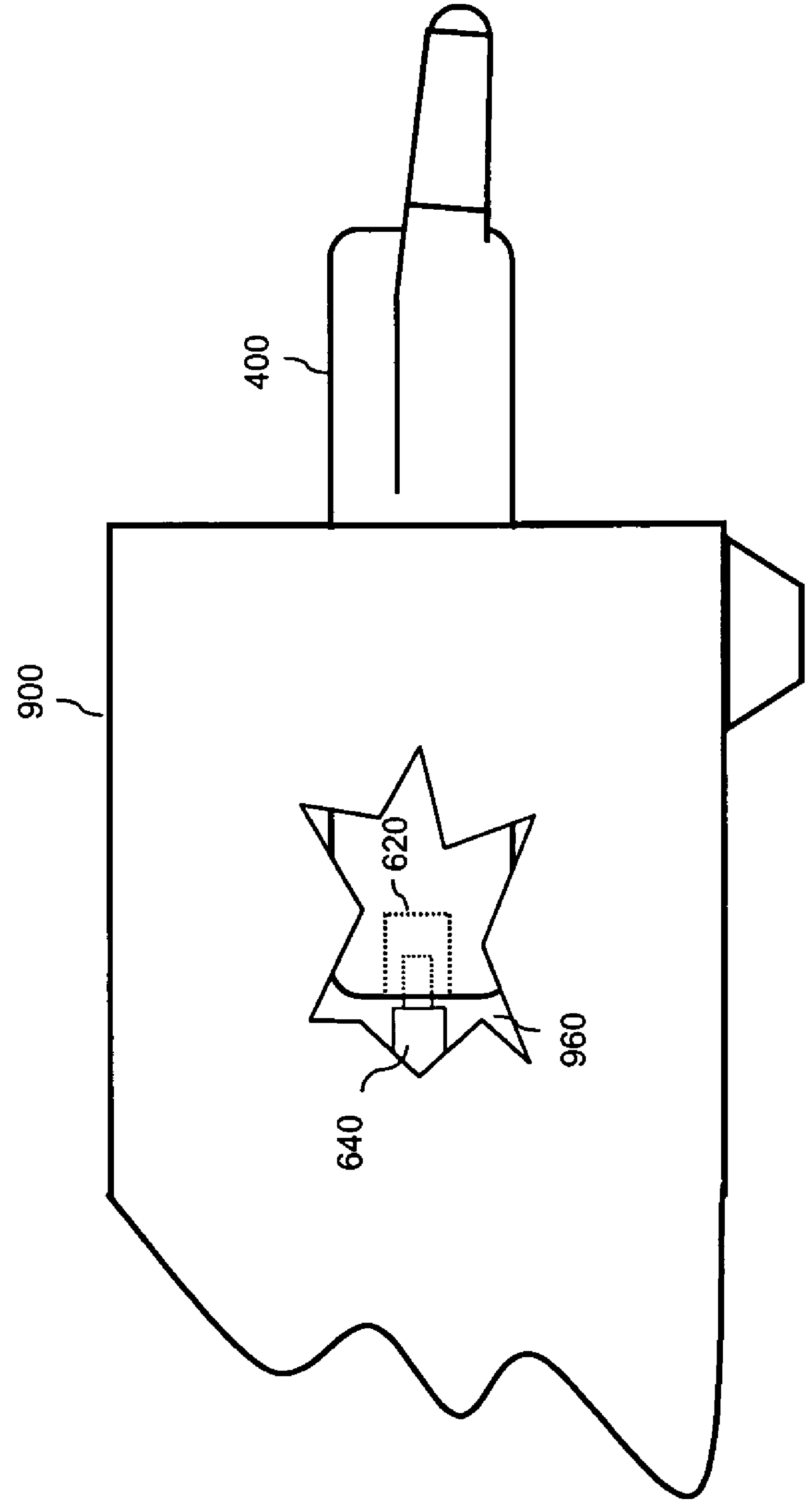
FIG. 16 is a side cutaway view of an illustrative STB with a mobile phone receiving bay with a mobile phone inserted therewith.

FIG. 14*s* and 15 show a side view of STB 900 and illustrate a mobile phone 400 being inserted through an opening in the front panel into the mobile phone receiving bay 960 disposed in the interior of STB 900. FIG. 16 is a side cutaway view of STB 900 showing that connectors 620 and 640 are mateably engaged.

Figure 17:
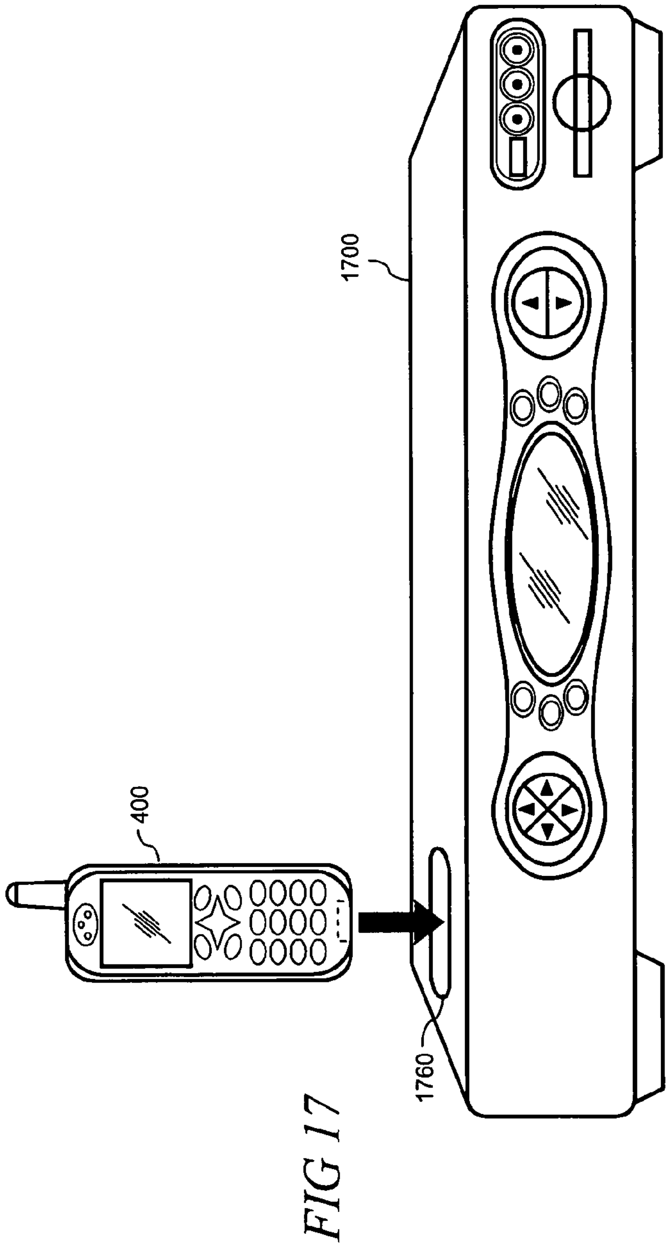
FIG. 17 is a simplified pictorial representation of an illustrative STB having a phone receiving bay with an opening in the top surface.
Figure 18:
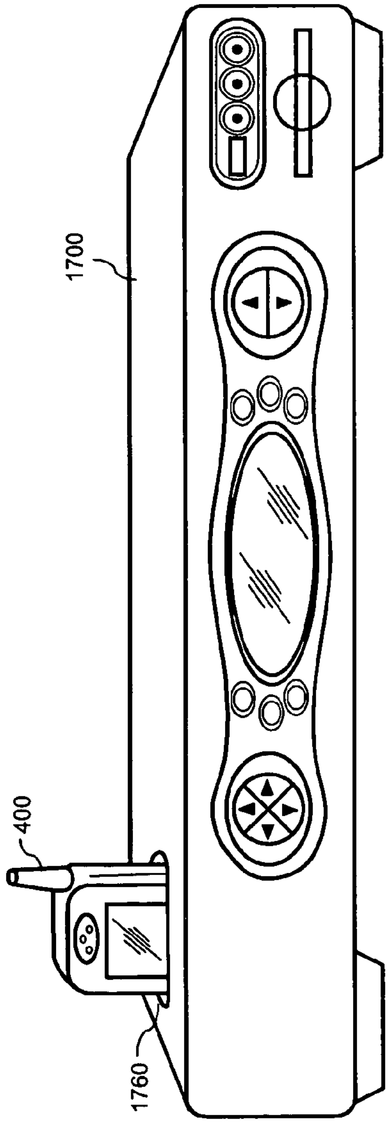
FIG. 18 is a simplified pictorial representation of an illustrative STB having a phone receiving bay with an opening in the top surface with a mobile phone inserted therethrough.

FIG. 17 is a simplified pictorial view of an illustrative STB 1700 having a phone receiving bay 1760 with an opening in the top panel of the STB. STB 1700 is thus configured to receive a mobile phone from the top as shown in FIG. 18. Aside from the vertical orientation of the mobile phone receiving bay 1760, STB 1700 is otherwise configured as STB 900 shown in FIGS. 9-16 and described in accompanying text.

Figure 19:
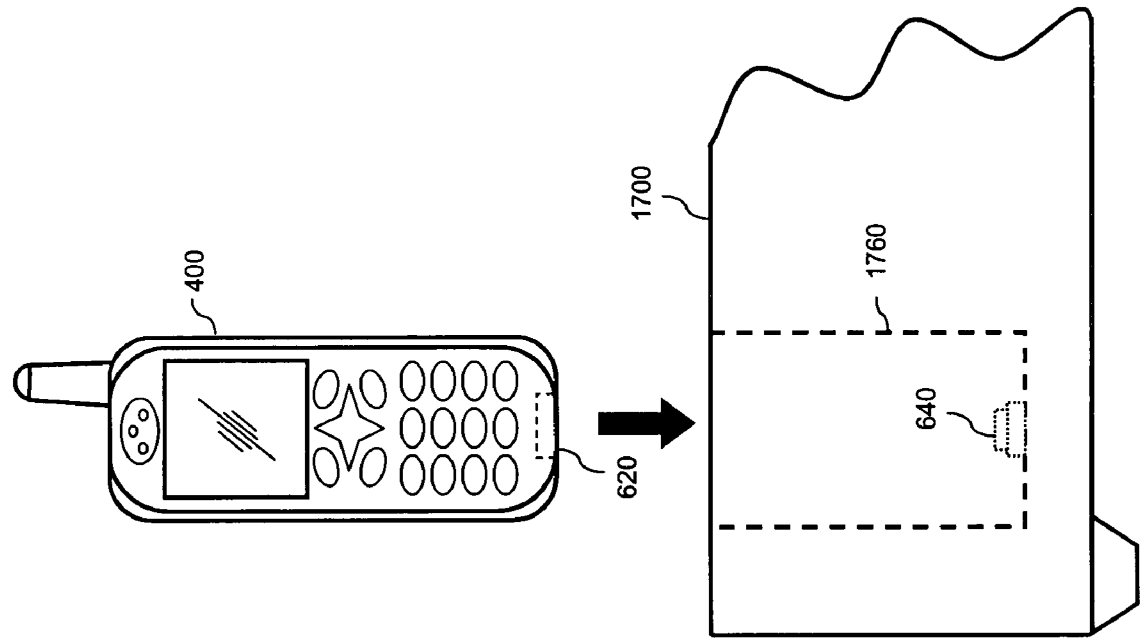
FIG. 19 is a front partial view of an illustrative STB with a mobile phone receiving bay.
Figure 20:
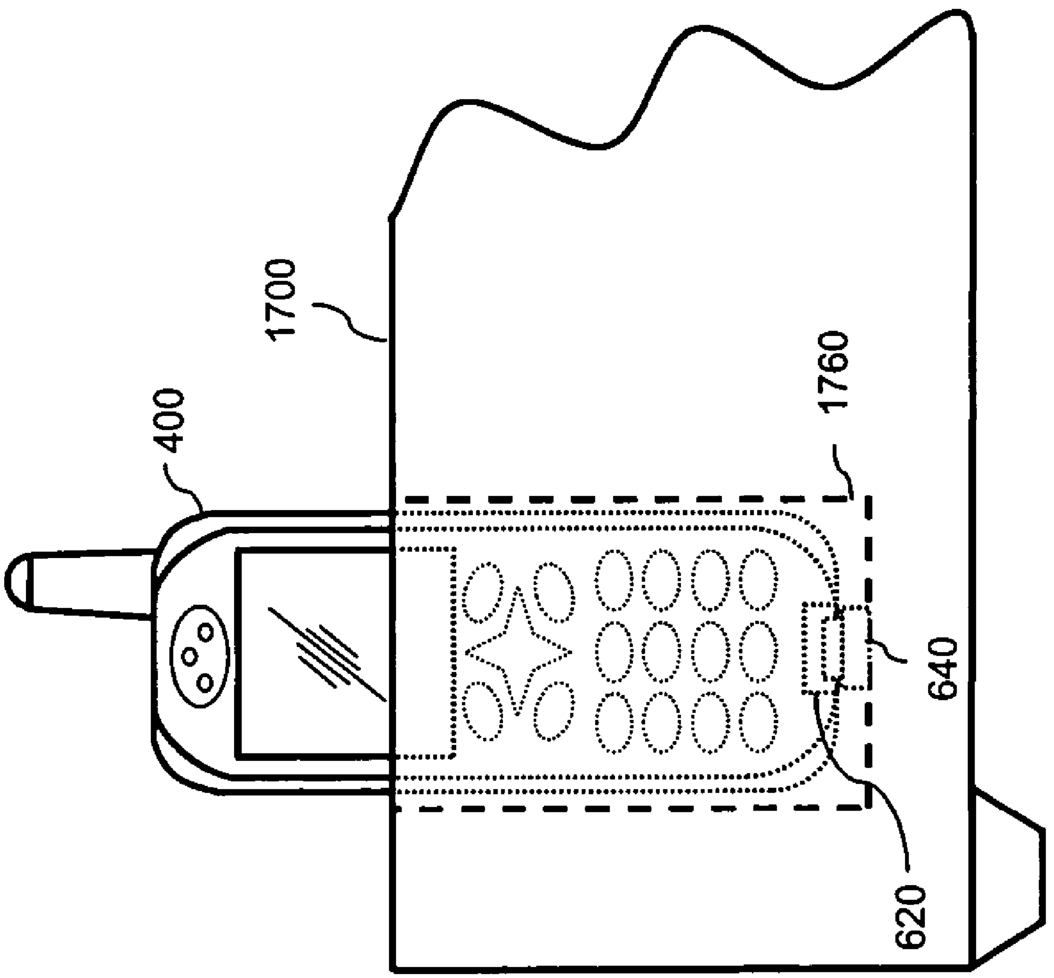
FIG. 20 is a front view partial of an illustrative STB with a mobile phone receiving bay and a mobile phone inserted therewith.
Figure 21:
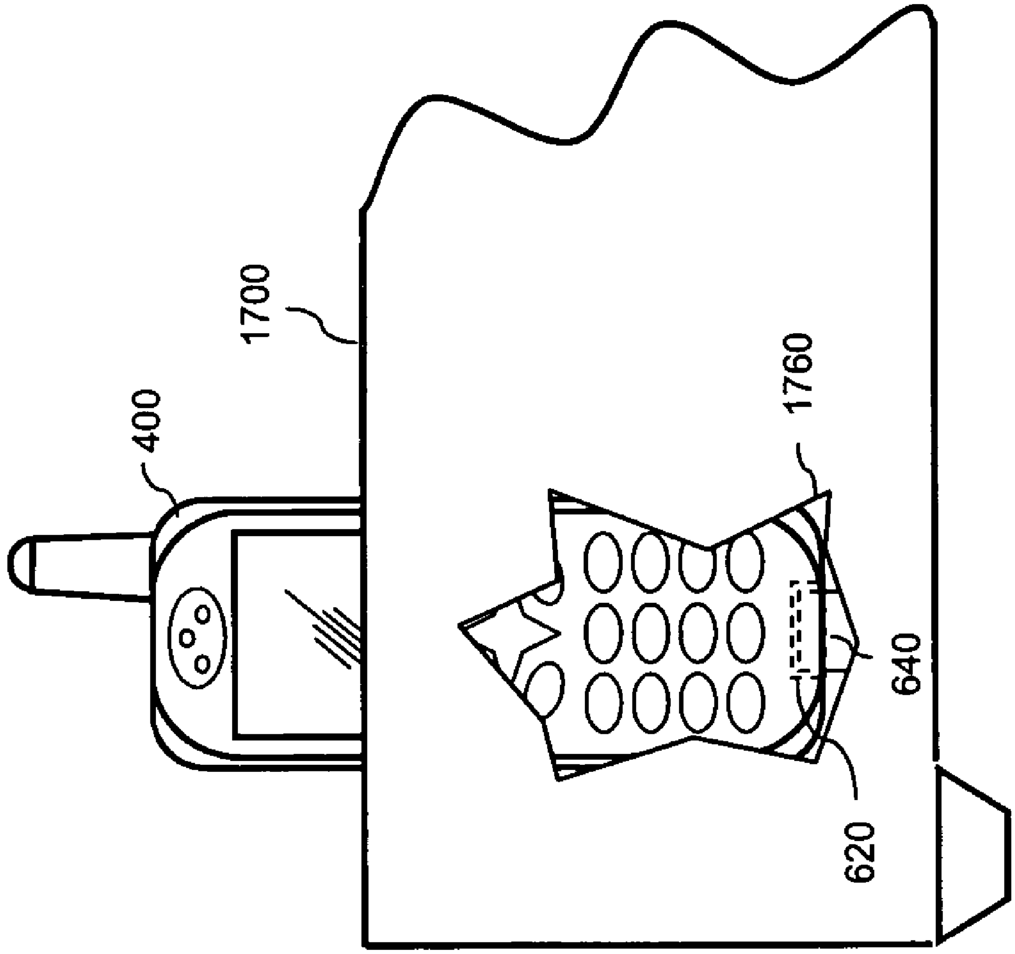
FIG. 21 is a front cutaway view of an illustrative STB with a mobile phone receiving bay with a mobile phone inserted therewith.

FIGS. 19 and 20 show a front partial view of STB 1700 and illustrate a mobile phone 400 being inserted through an opening in the top panel into the mobile phone receiving bay 1760 disposed in the interior of STB 1700. FIG. 21 is a front cutaway view of STB 900 showing that connectors 620 and 640 are mateably engaged.

Figure 22:
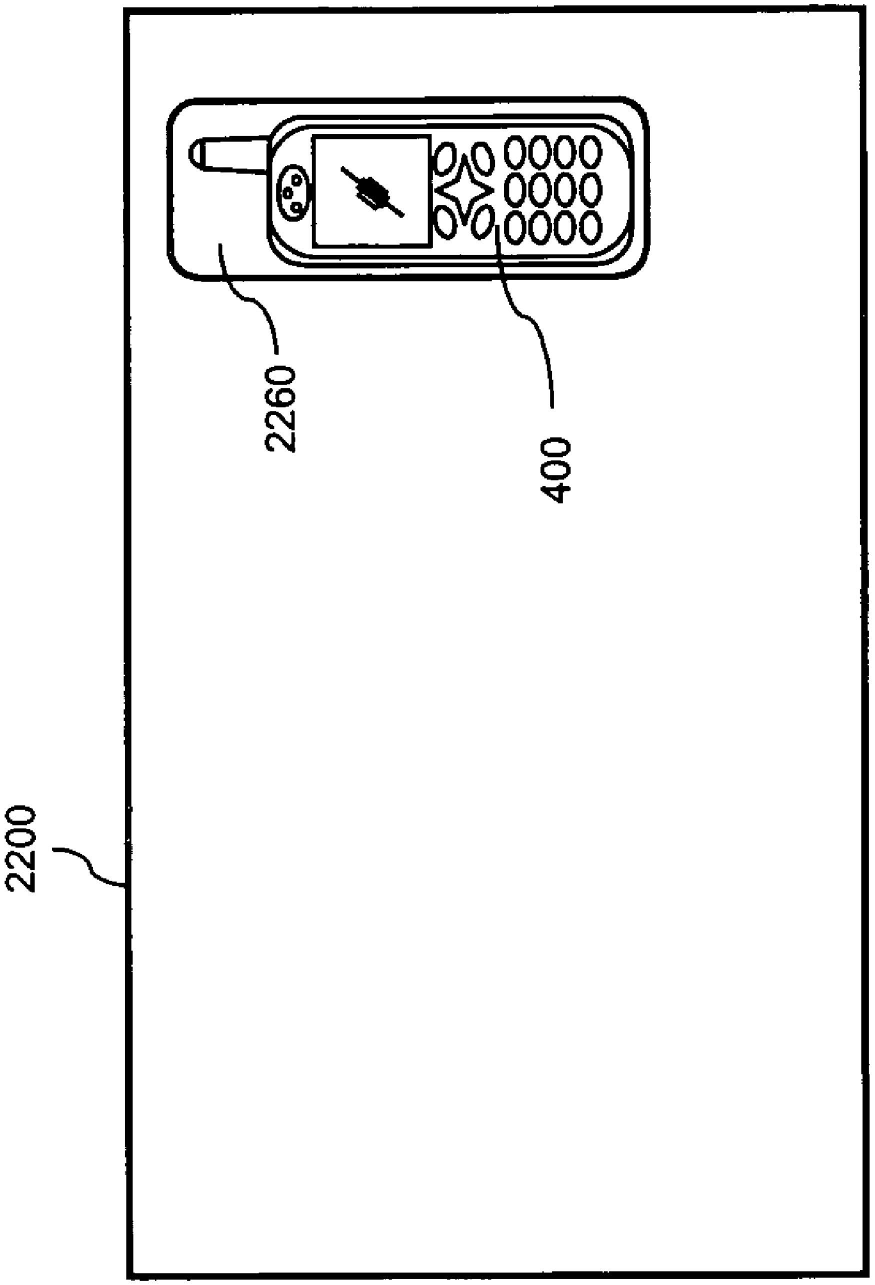
FIG. 22 is a top view of an illustrative STB with a mobile phone receiving bay disposed on its top surface that is configured to receive a non-flip-style mobile phone.
Figure 23:
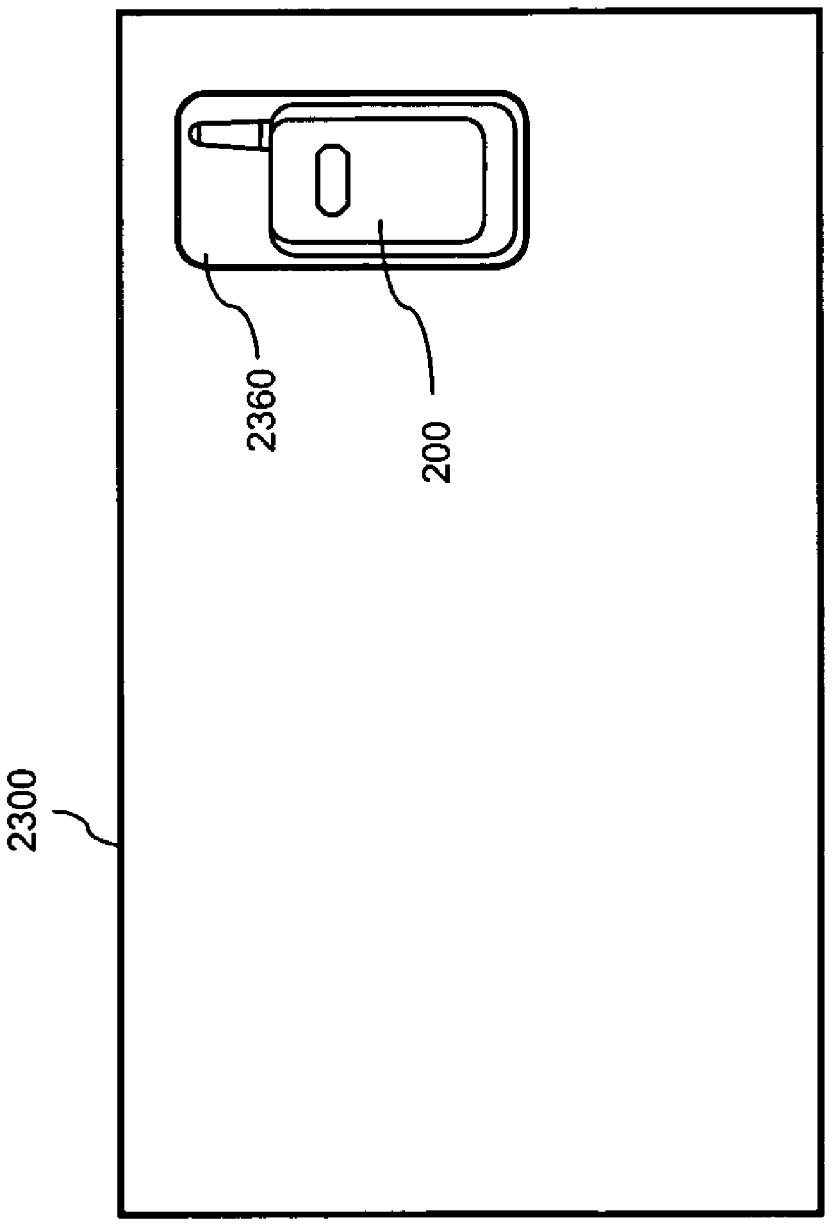
FIG. 23 is a top view of an illustrative STB with a mobile phone receiving bay disposed on its top surface that is configured to receive a flip-style mobile phone.

FIG. 22 is a top view of an illustrative STB 2200 with a mobile phone receiving bay 2260 disposed on its top exterior surface that is configured to receive a non-flip-style mobile phone 400. FIG. 23 is a top view of an illustrative STB 2300 with a mobile phone receiving bay 2360 disposed on its top exterior surface that is configured to receive a flip-style mobile phone 200.

In the illustrative STB examples shown in FIGS. 22 and 23, the mobile phone receiving bay opening is arranged to be coextensive with the largest peripheral dimension of the mobile phones 200 and 400. That is, the opening is configured so that the long dimension of the mobile phones 200 and 400 are substantially parallel with the top surface of STBs 2200 and 2300 when inserted into their respective mobile phone receiving bays. In some applications, the depth of the mobile phone receiving bays 2260 and 2360 are arranged so that the front surface of a mobile phone inserted into the bay is substantially co-planar (i.e., "flush") with the top panel of the STB. In other applications, the top surface of the mobile may be raised above, or recessed below, the top panel of the STB.

Figure 24:
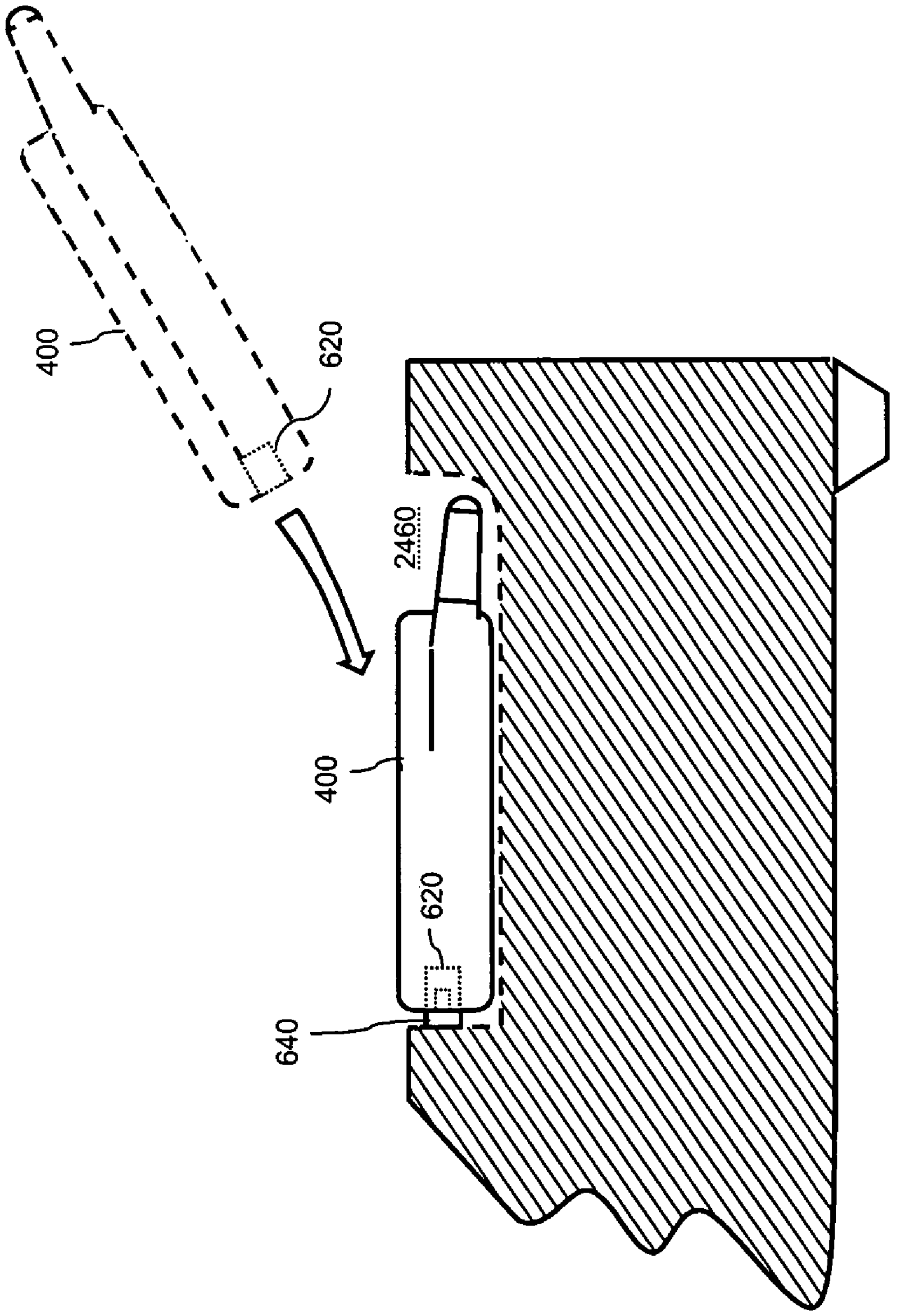
FIG. 24 is a side cross-sectional view of the illustrative STB shown in FIG. 22.

FIG. 24 is a side cross-sectional view of the illustrative STB shown in FIG. 22. As shown, device connector 620 is arranged on the rearward wall of the mobile phone receiving bay (indicated by reference numeral 2460 in FIG. 4). As shown, a user guides mobile phone 400 into the mobile phone receiving bay 2460 so that its bottom surface with accessory connector 620 can be mateably engaged with the device connector 620.

It is recognized that mobile phones are configured in a variety of form factors, sizes and shapes. Accordingly, to accommodate different mobile phone shapes within a single mobile phone receiving bay, adapters are optionally utilized.

Such adapters may be used in some applications to further facilitate secure retention of the mobile phone within the receiving bay of the STB.

Figure 25:
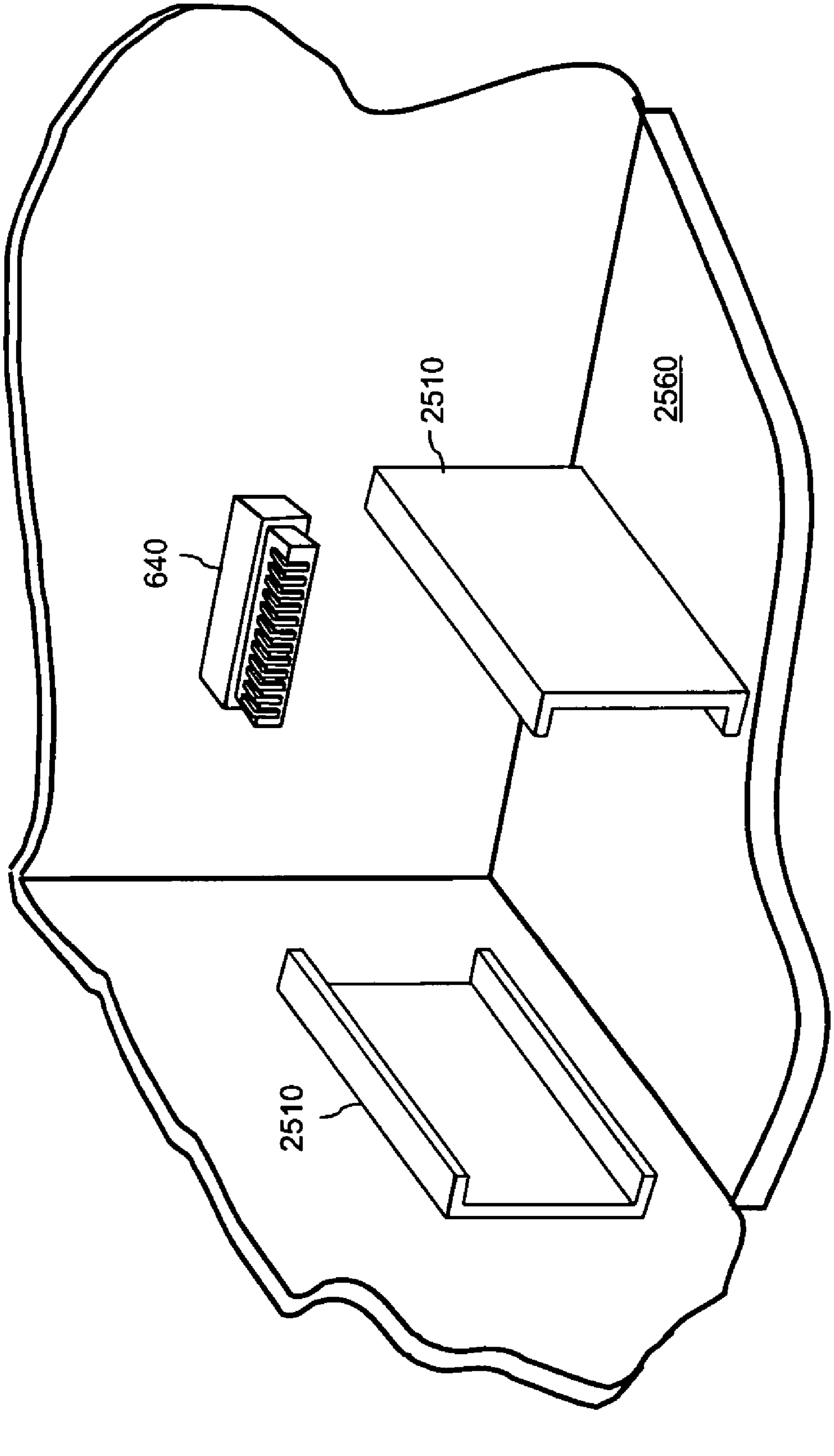
FIG. 25 is an enlarged interior perspective view of an illustrative mobile phone receiving bay having an adapter used to position a mobile phone with the receiving bay.

FIG. 25 is an enlarged interior perspective view of an illustrative mobile phone receiving bay 2560 with a device connector 640 and having an adapter 2510 used to position a mobile phone with the receiving bay. In this illustrative example, mobile phone receiving bay 2560 is arranged as an internal volume with a STB like those utilized in STBs 900 and 1700 as described above.

Adapter 2510 is typically utilized to fill in gaps that may otherwise exist between a particular mobile phone and the walls which define the mobile phone receiving bay 2560 so as to provide a more secure fit. In addition, adapter 2510 may also be used to help provide proper registration between the accessory connector 620 and device connector 640 as the mobile phone is inserted into the mobile phone receiving bay 2560.

Although adapter 2510 is shown as two pieces in FIG. 25, it will be appreciated that other configurations are readily used. For example, adapters are alternatively formed using a single unitary construction or multiple piece construction.

Figure 26:
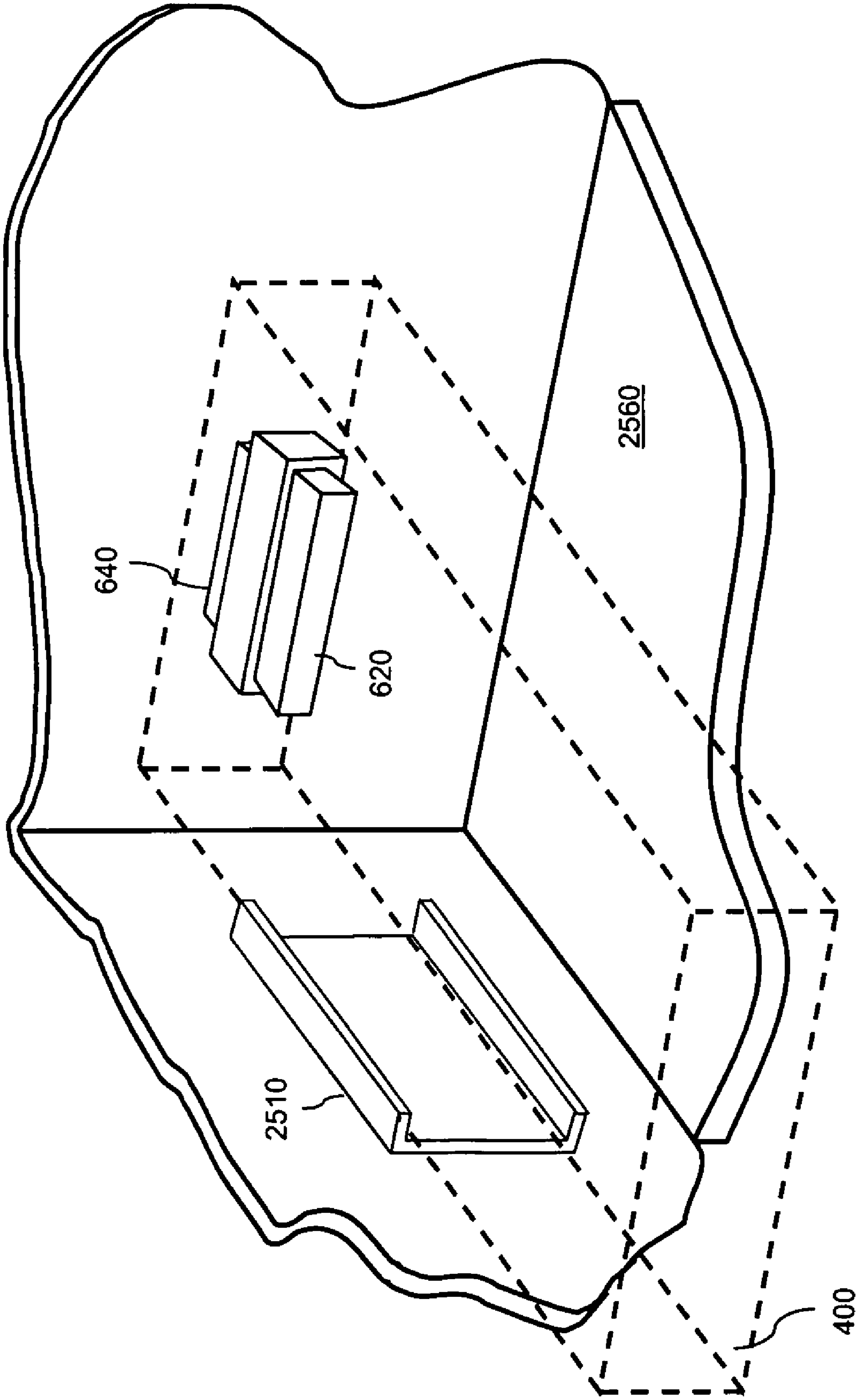
FIG. 26 is an enlarged interior perspective view of the illustrative mobile phone receiving bay shown in FIG. 25 with a mobile phone positioned within the bay.

FIG. 26 is an enlarged interior perspective view of the illustrative mobile phone receiving bay 2560 with a mobile phone 400 (shown in phantom lines) positioned within the bay. For clarity of illustration, the right side member of adapter 2510 is removed from the illustration shown in FIG. 26. As shown, adapter 2510 includes parallel spaced rib portions which laterally project into the mobile phone receiving bay 2560. The adapter 2510 is sized to enable mobile phone 400 to slidably engage with adapter 2510 as the mobile phone 400 is inserted into the receiving bay 2560.

Figure 27:
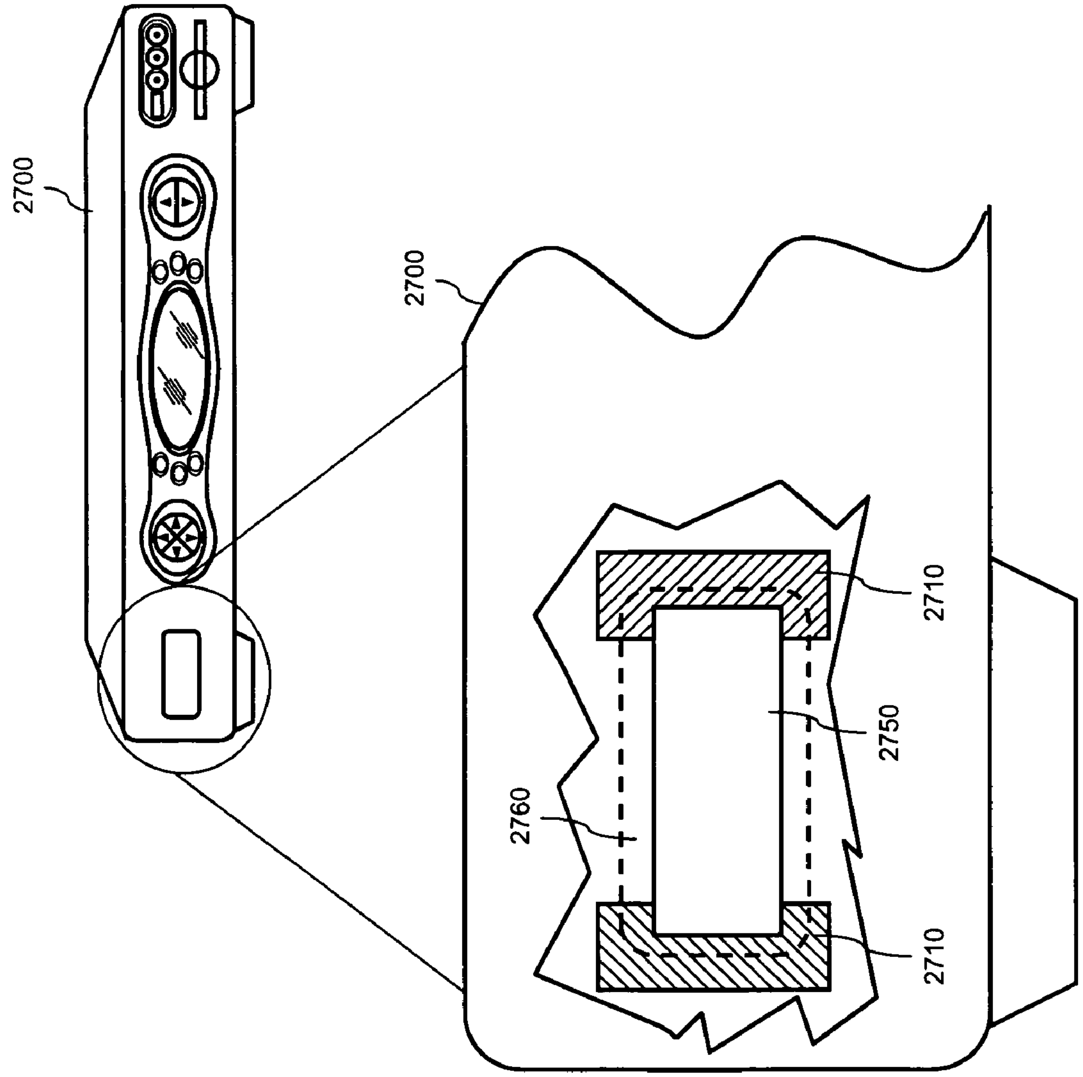
FIG. 27 shows a cross sectional view of a first illustrative adapter in a mobile phone receiving bay of a STB.

FIG. 27 shows a cross sectional view of a first illustrative adapter 2710 in a mobile phone receiving bay 2760 of a STB 2700 when viewing the front of the STB. In this illustrative example, the adapter 2710 is arranged to slidably engage with the sides of a mobile phone 2750 having a rectangular cross sectional shape. This shape is typical for many non-flip-style mobile phones.

Figure 28:
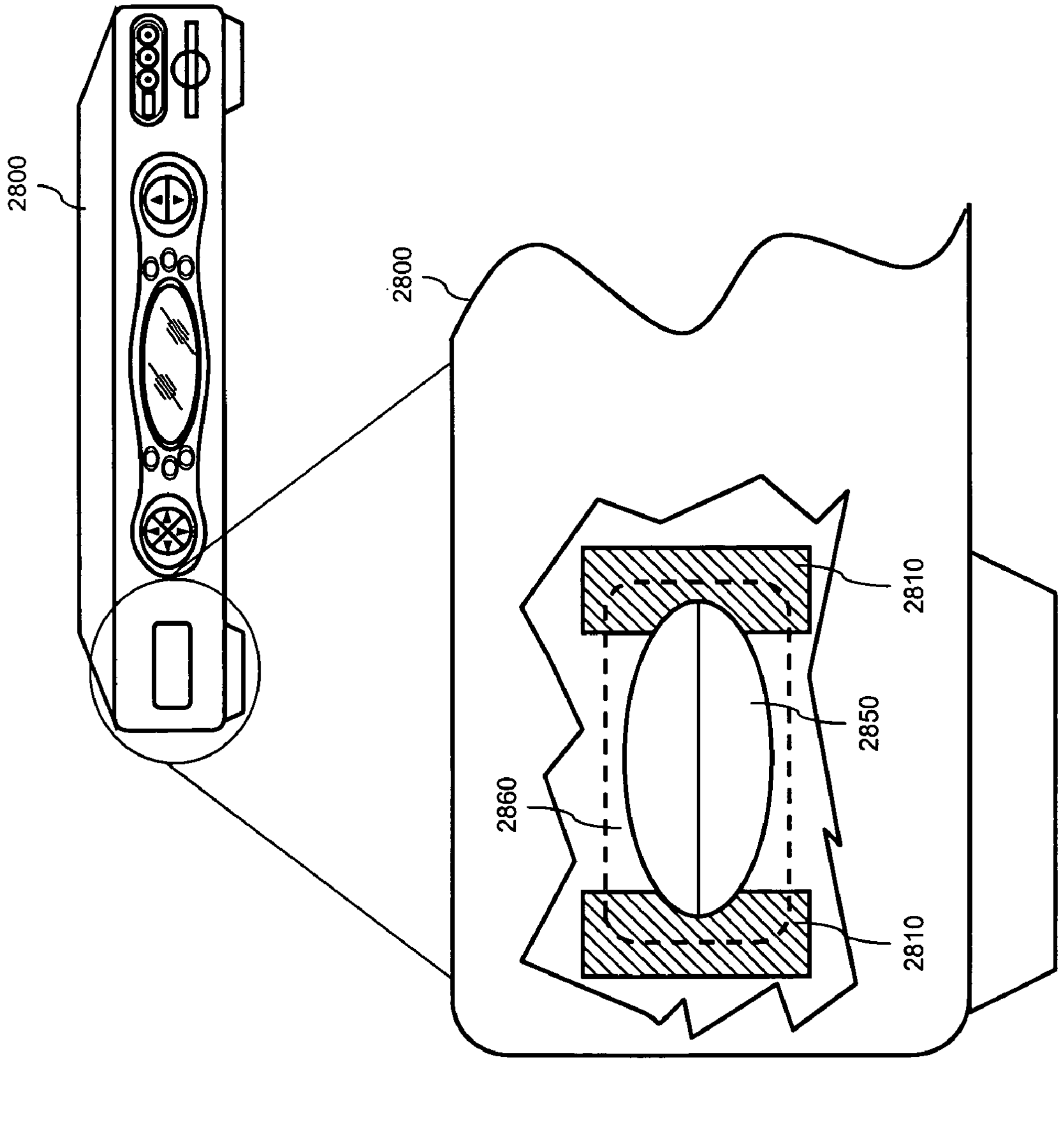
FIG. 28 shows a cross sectional view of a second illustrative adapter in a mobile phone receiving bay of a STB.

FIG. 28 shows a second illustrative adapter 2810 that is arranged to slidably engage with the sides of a mobile phone 2850 having an oval cross sectional shape. This shape is typical for many flip-style mobile phones. Adapter 2810 is disposed in a mobile phone receiving bay 2860 of STB 2800 as shown.

Figure 29:
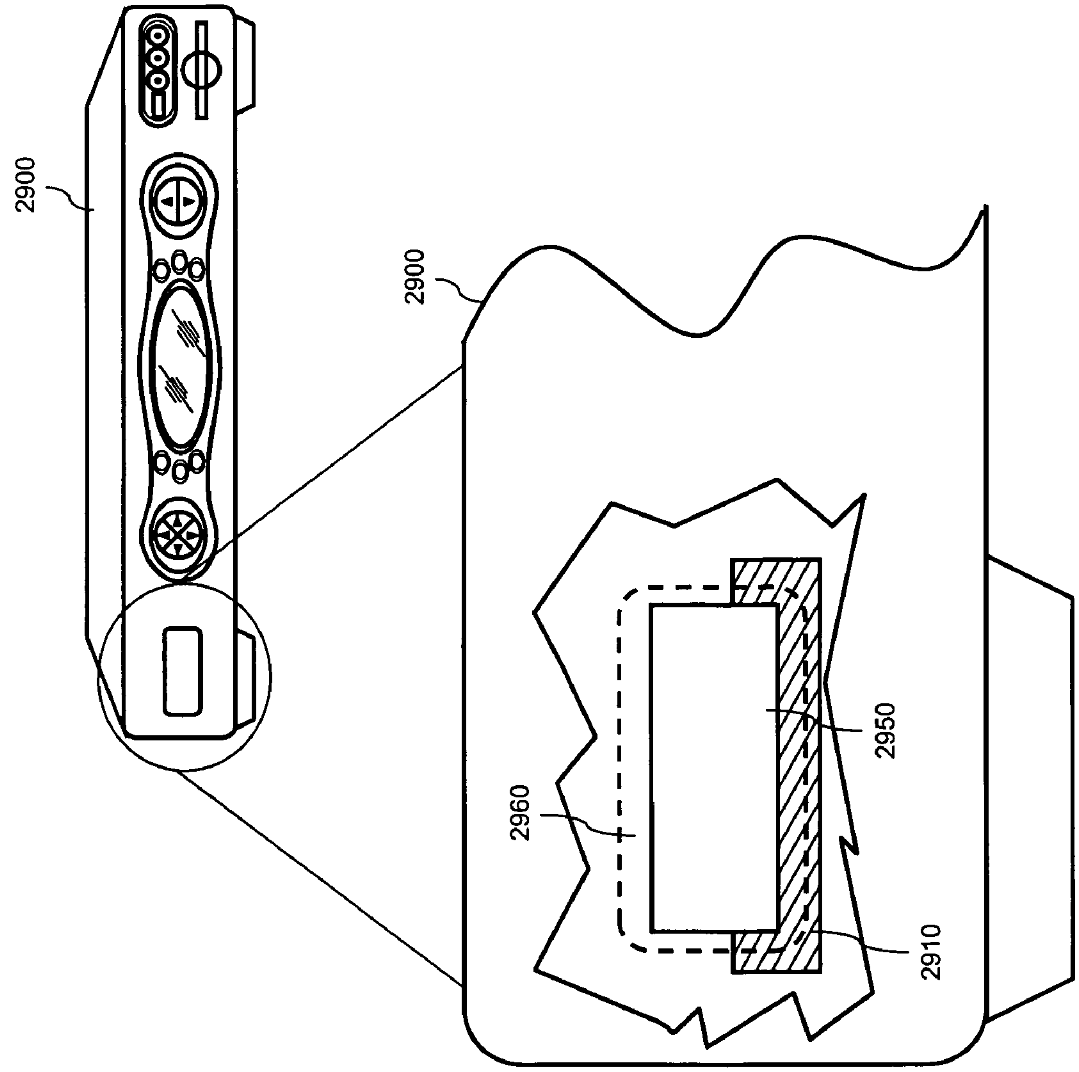
FIG. 29 shows a cross sectional view of a third illustrative adapter in a mobile phone receiving bay of a STB.
Figure 30:
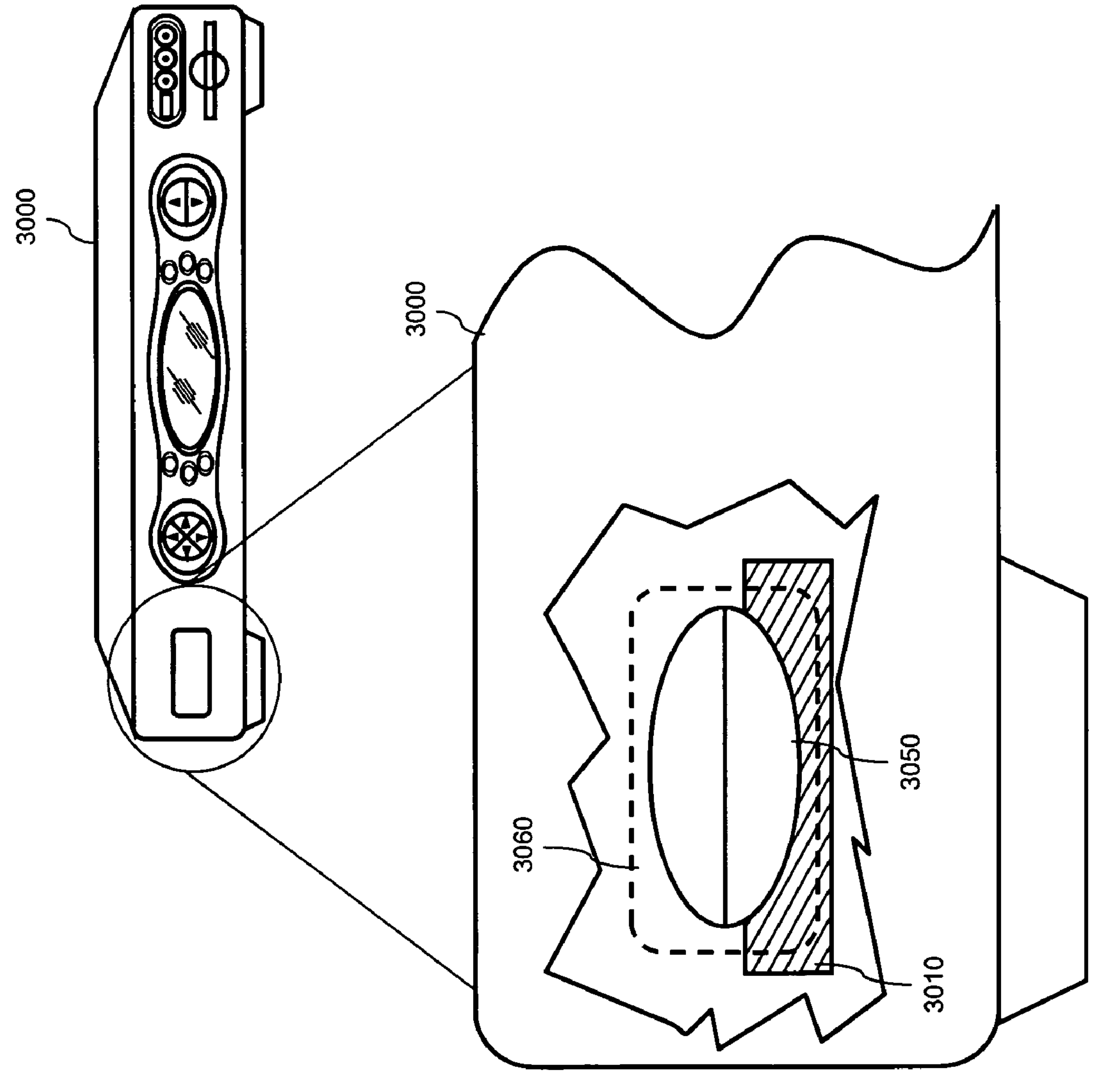
FIG. 30 shows a cross sectional view of a fourth illustrative phone adapter in a mobile phone receiving bay of a STB.

FIGS. 29 and 30 shows third and fourth illustrative adapters 2910 and 3010, respectively, that are arranged to support and slidably engage with a mobile phone by its back and side surfaces. Adapter 2910 is disposed in a mobile phone receiving bay 2960 of STB 2900 and slidably engages with mobile phone 2950 as shown in FIG. 29. Adapter 3010 is disposed in a mobile phone receiving bay 3060 of STB 3000 and slidably engages with mobile phone 3050 as shown in FIG. 30.

It is noted that the adapters shown in FIGS. 27-30 are merely illustrative. Other shapes and configurations for adapters may be readily selected using the principles described above to fit the mobile phone forms used in a specific application. It is also emphasized that while an adapter arrangement for use with a horizontally oriented mobile phone receiving bay (i.e., one with an opening in the front panel of a STB as shown in FIGS. 9-15) is shown in FIGS. 27-30, adapters may be used with mobile phone receiving bays having other orientations.

Figure 31:
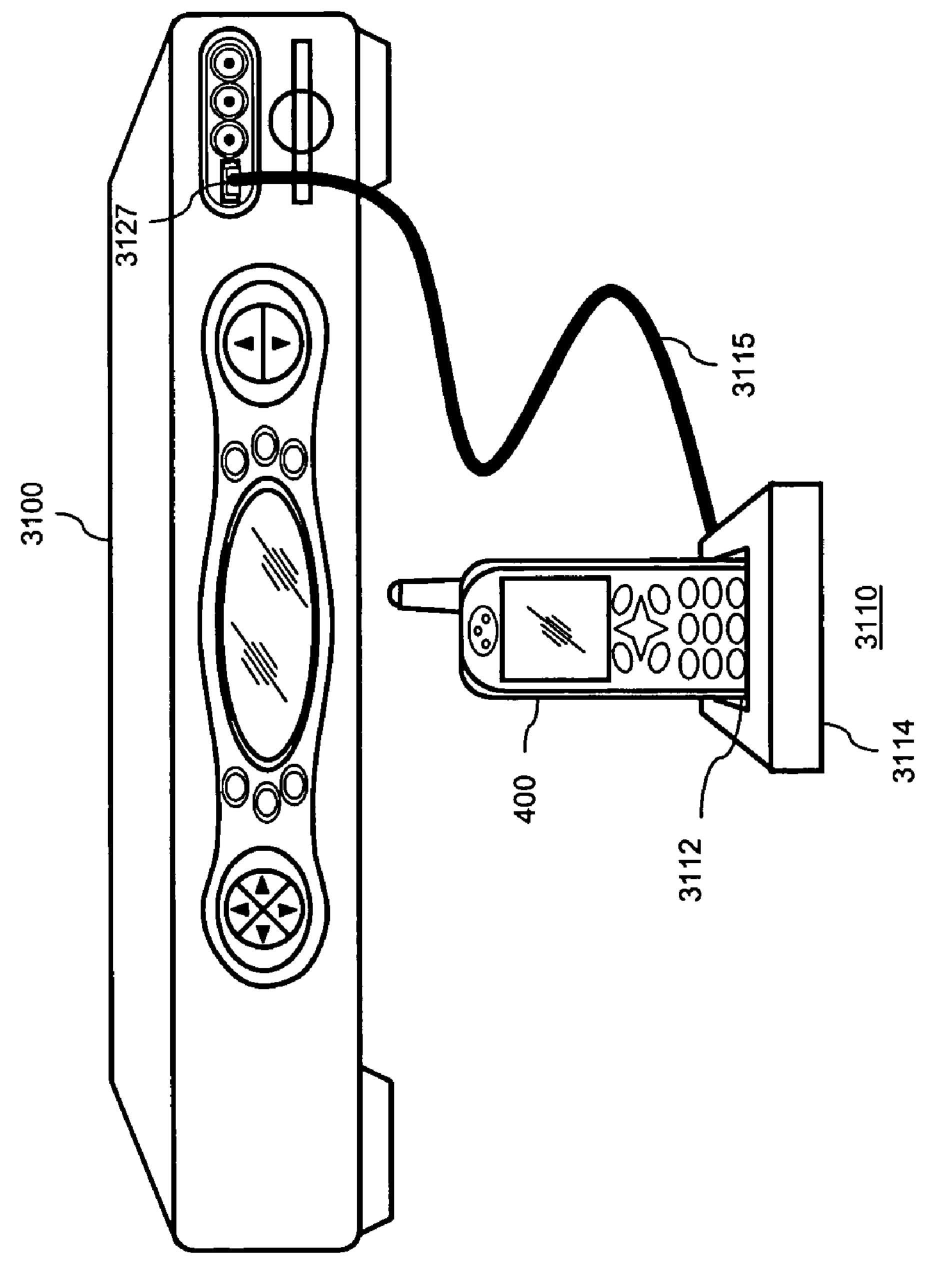
FIG. 31 is a simplified pictorial representation of an illustrative external docking bay with a docked mobile phone where the docking bay is equipped with a cable connection to a STB.

FIG. 31 is a simplified pictorial representation of an illustrative external docking station 3110 with a docked mobile phone 400 where the docking station is equipped with a cable 3115 that is connected to a STB 3100. By "external," it is meant that docking station is physically separated from but operatively connectable to a STB as a standalone device rather than being integrated therewith as described above. Accordingly, the cable 3115 is plugged into the data connector 3127 which is configured as a USB connector, in this illustrative example. Alternatively, external docking station 3110 is configured to communicate with STB 3100 using one or more of the wireless communication formats discussed above when the STB 3100 and mobile phone 400 are equipped with wireless transceivers.

In some applications, it may be desirable to eliminate the use of docking station 3110 and have the mobile phone dock with the STB using just the wireless link. However in this case, the mobile phone receives data downloads only and will not be able to receive operating or charging power as is typically the case when using either an integrated dock (i.e., receiving bay) or external docking station.

As shown, the external docking station 3110 is arranged with an opening 3112 to position mobile phone 400 in an upright position within base 3114. In various applications, the opening is arranged vertically or sloped so that the mobile phone 400 is oriented in the desired position. In some applications it may be helpful for the screen 410 (FIG. 4) to be readable and keys 432 (FIG. 4) be positioned in an accessible manner. For example, the screen may be used to display docking status or to indicate that a download to the mobile phone 400 was accomplished successfully.

Figure 32:
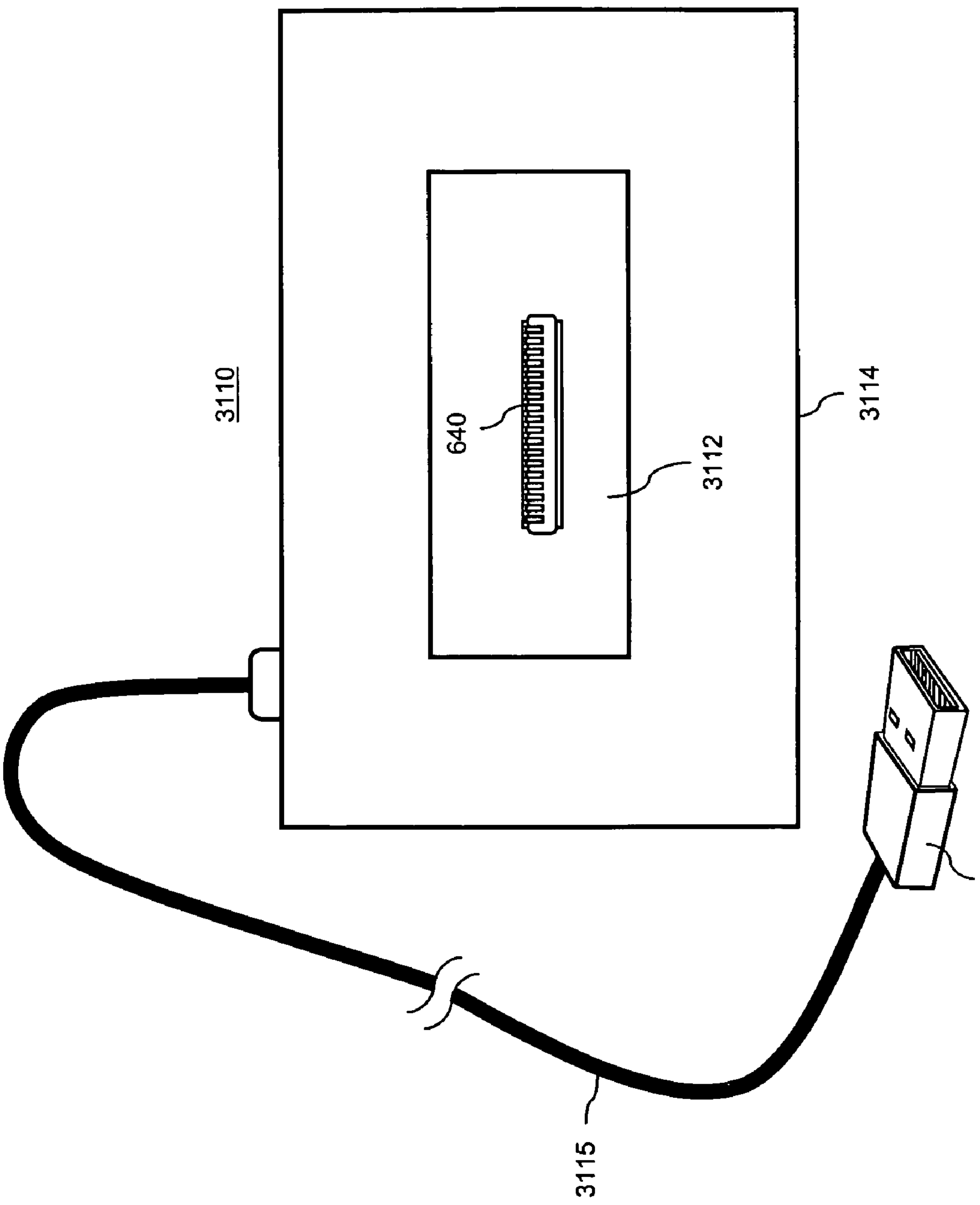
FIG. 32 is a top view of an illustrative external docking station.

FIG. 32 is a top view of an illustrative external docking station 3110. Inside the opening 3112 in base 3114 of the external docking station 3110, a device connector 640 (FIG. 6) is disposed which is operatively connectable to the accessory connector 620 positioned on the bottom of a mobile phone as shown in FIG. 8 and described in the accompanying text. Cable 3115 is arranged to couple to device connector 640 and transmit signals between STB 3160 (FIG. 31) and external docking station 3110 through the USB plug 3242 and cable 3115.

Figure 34:
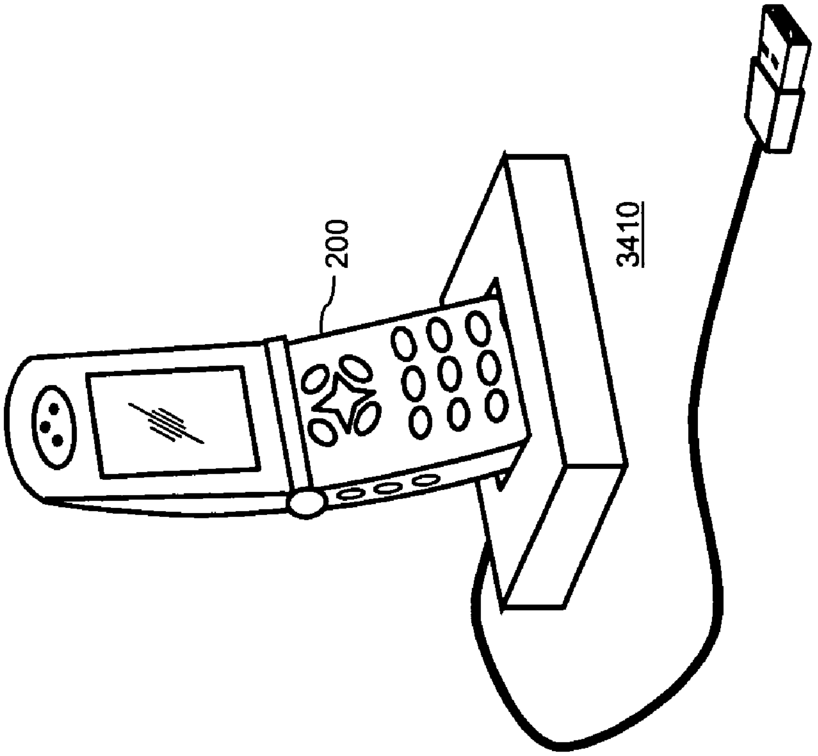
FIG. 34 is a simplified pictorial representation of an illustrative external docking station configured to receive a flip-style mobile phone where the phone is in an open position.
Figure 33:
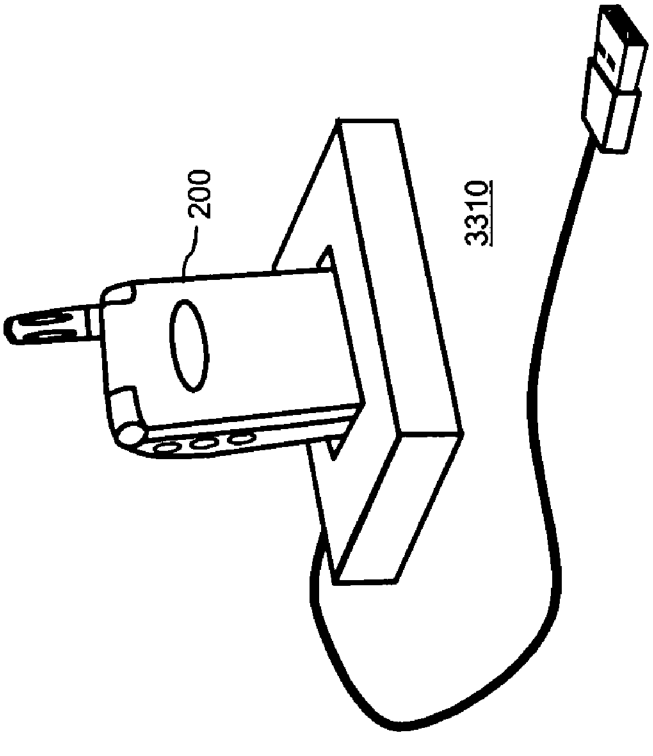
FIG. 33 is a simplified pictorial representation of an illustrative external docking station configured to receive a flip-style mobile phone where the phone is in a closed position.

External docking station 3110 may be arranged to fit a number of different mobile phone forms. Both docking station opening 3112 and base 3114 may be configured to operatively engage with specific phones types, or adapters may be used that are similar in form and operation to those shown in FIGS. 27-30 and described in the accompanying text. Accordingly, FIG. 33 shows a simplified pictorial representation of an illustrative external docking station 3310 configured to receive a flip-style mobile phone 200 (FIG. 2) where the phone is in a closed position. FIG. 34 shows a simplified pictorial representation of an external docking station 3410 configured to receive a flip-style mobile phone 200 where the phone is in an open position. As noted above, in some applications it may be desirable for the external docking station to be arranged so as to position the mobile phone where the keys 222 (FIG. 2) are accessible and screen 210 (FIG. 2) is visible while the mobile phone 200 is operatively coupled to a STB.

Figure 35:
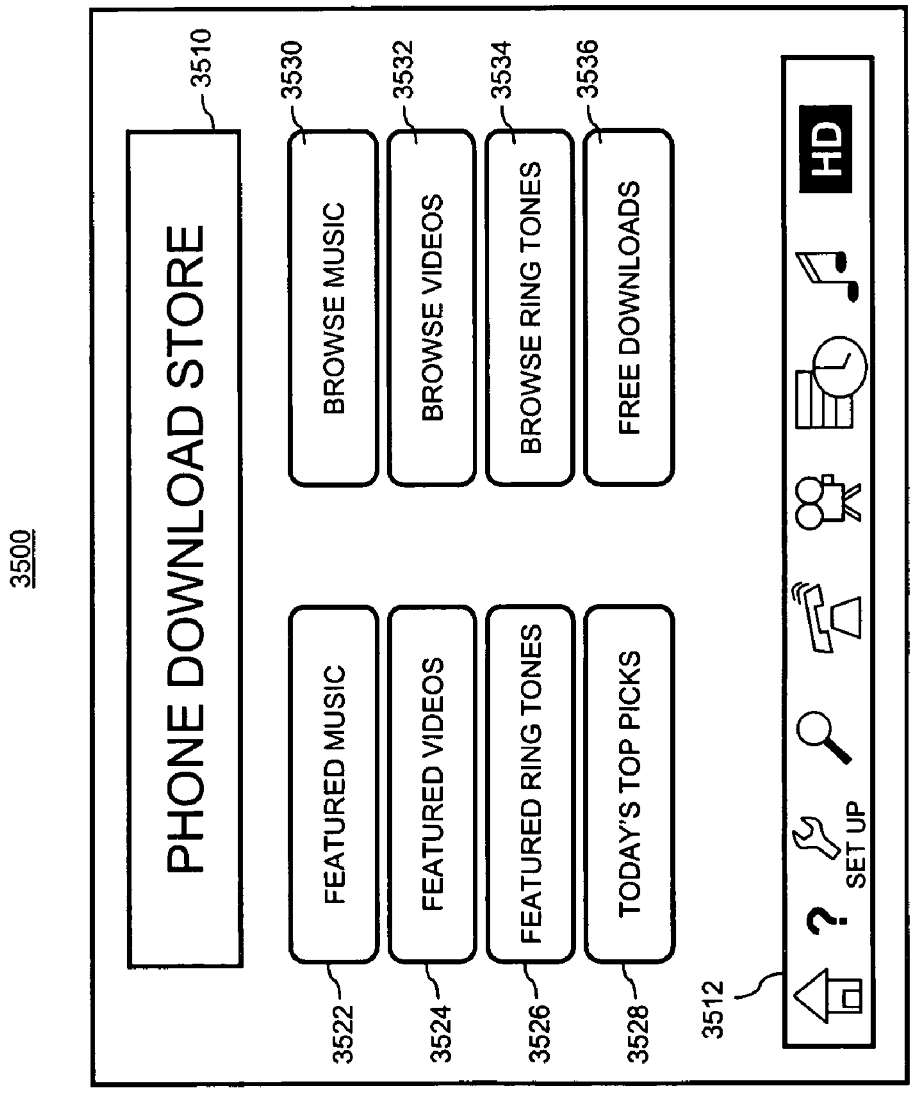
FIG. 35 is a simplified pictorial representation of a screen shot of a first illustrative menu in a graphical user interface displayed by an STB on a television.

FIG. 35 is a simplified pictorial representation of a screen shot of a first illustrative menu 3500 that is incorporated in a graphical user interface displayed by an STB on a television. For example, menu 3500 is part of an EPG used to access an electronic storefront providing music, video and ring tone downloads in popular digital formats. Menu 3500 is an example of a main menu for the electronic storefront.

Menu 3500 includes typical elements displayed using EPGs including a screen title field 3510 used to indicate where in the menu hierarchy a user is currently located. A navigation bar 3512 is provided which typically includes a variety of user selectable icons to assist the user in jumping from place to place in the menu hierarchy. A number of selectable fields (i.e., "buttons") 3522, 3524, 3526, 3528, 3530, 3532, 3534 and 3536 are also used in menu 3500 with functions as noted in the figure. By moving through the menu 3500, a user can look at featured media content or browse through media content. Any media content of interest can be downloaded to a mobile phone docked to the STB hosting the electronic storefront. In some applications, for example when the downloaded media content includes music, the electronic storefront will employ a DRM scheme to restrict the usage of media purchased and downloaded through the STB.

Figure 36:
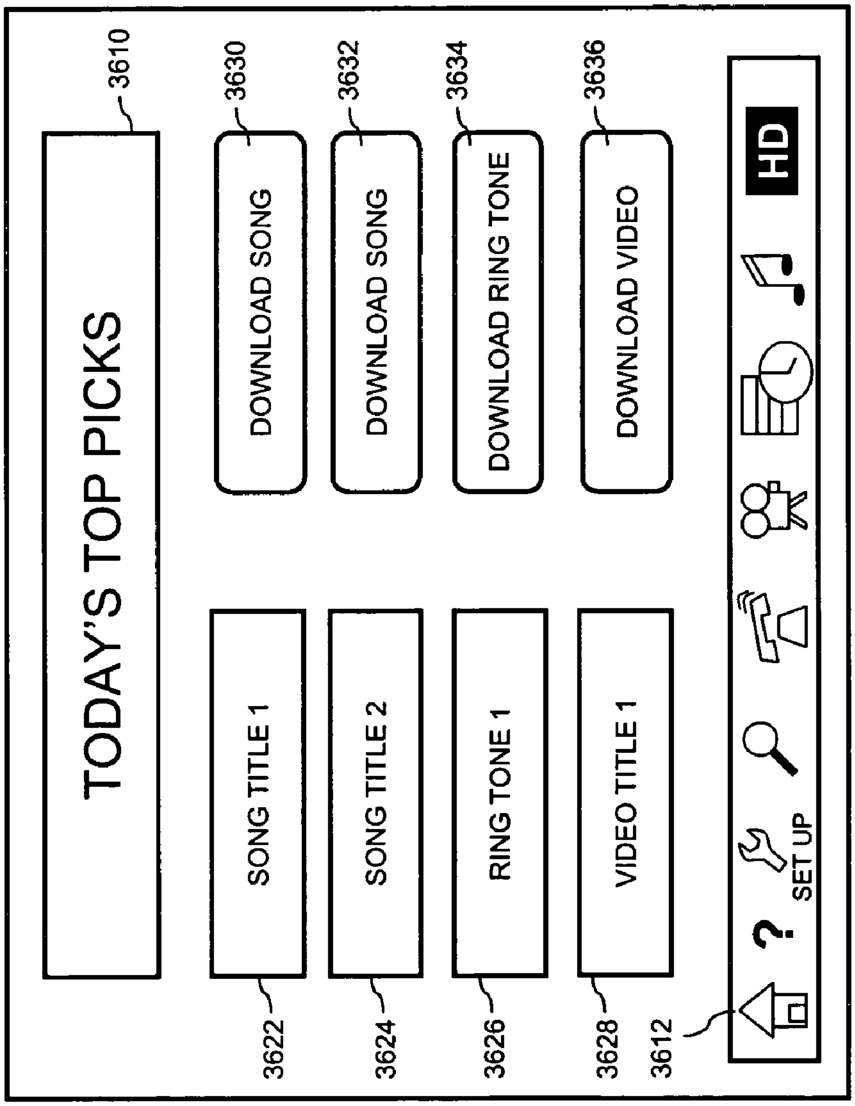
FIG. 36 is a simplified pictorial representation of a screen shot of a second illustrative menu in a graphical user interface displayed by an STB on a television.

FIG. 36 is a simplified pictorial representation of a screen shot of a second illustrative menu 3600. Menu 3600 contains a title field 3610 and a navigation bar 3612 as described above. Menu 3600 displays media content in fields 3622, 3624, 3626 and 3628 in the left hand column of the menu 3600 that is available for selection and downloading. User selectable fields 3630, 3632, 3634 and 3636 in the right hand column of the menu 3600 correspond to the available media content shown in the left hand column. Thus, when a user selects button 3630 on menu 3600, then a song having Title 1 is downloaded to the user's mobile phone.

Menu 3600 is an example of a secondary menu that is arranged one level below the main menu 3500 in the menu hierarchy (in this illustrative example). According, menu 3600 is accessed when a user selects button 3828 in FIG. 35 to go to "Today's Top Picks."

Figure 37:
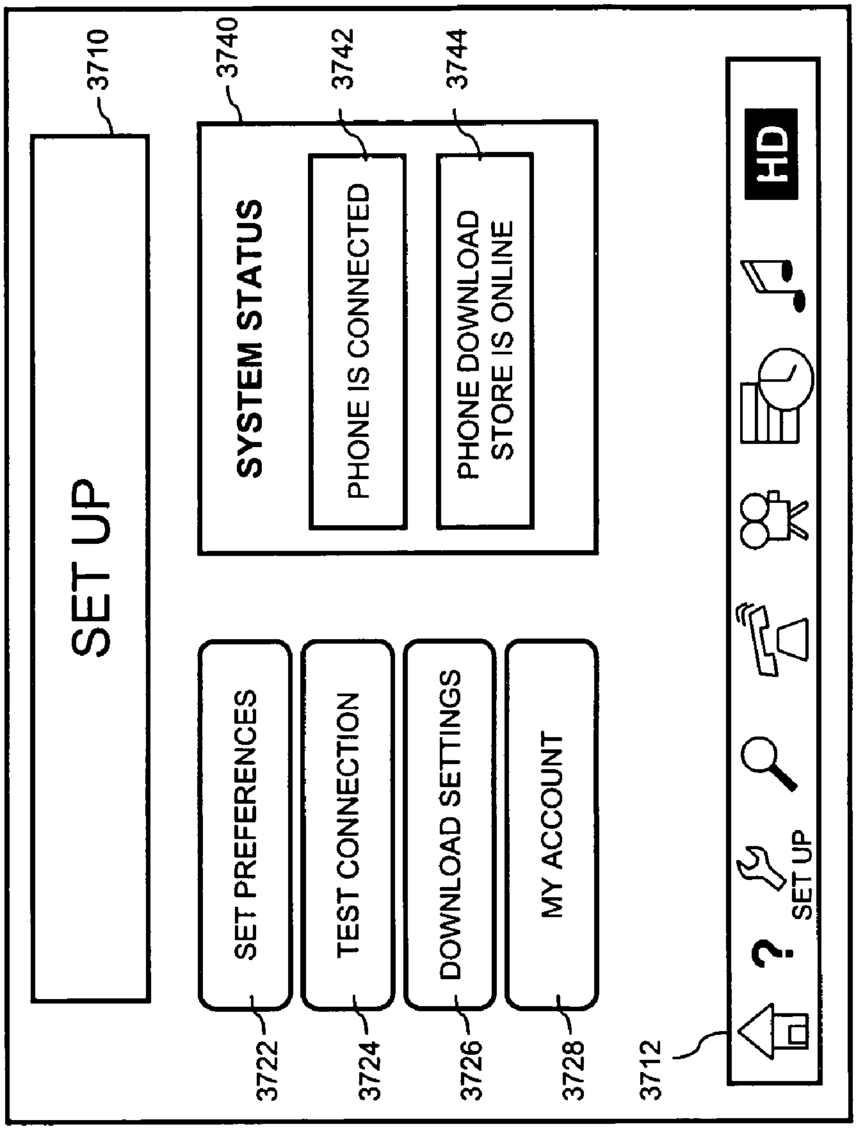
FIG. 37 is a simplified pictorial representation of a screen shot of a third illustrative menu in a graphical user interface displayed by an STB on a television.

FIG. 37 is a simplified pictorial representation of a screen shot of a third illustrative menu 3700 in a graphical user interface displayed by an STB on a television. Menu 3700 contains a title field 3710 and a navigation bar 3712 as described above Menu 3700 is an example of a screen accessed by a user by going to the "set up" icon in menu bars 3512 and 3612 in FIGS. 35 and 36. A number of selectable fields 3722, 3724, 3726 and 3728 are used in menu 3700 with functions as noted in the figure. For example, the "My Account" button 3788 takes the user to a summary of the user's account including recent downloads, accounts balances and similar information.

Current system status information 3740 is displayed in menu 3700 as shown. In this illustrative example, field 3742 indicates that a mobile phone is recognized by the STB as being connected. This status indicator may be used to supplement or replace the optional visual or audio indicator noted above in the text accompanying FIG. 9. If there were a problem with the connection (for example, if the mobile phone is not properly seated in the mobile phone receiving bay of the STB, or it isn't charged sufficiently to operate) then field 3742 would include a message that the mobile phone is not connected. Other system information such as the status of the electronic storefront as being online or offline is shown in field 3744.

It is emphasized that the menus shown in FIGS. 35-37 are merely illustrative and show one example of a hierarchical menu system using an EPG hosted on STB that is used to facilitate media content downloading to a mobile phone that is operatively docked to the STB. Other menus may be created and used in accordance with the specific requirements of an application.

Figure 38:
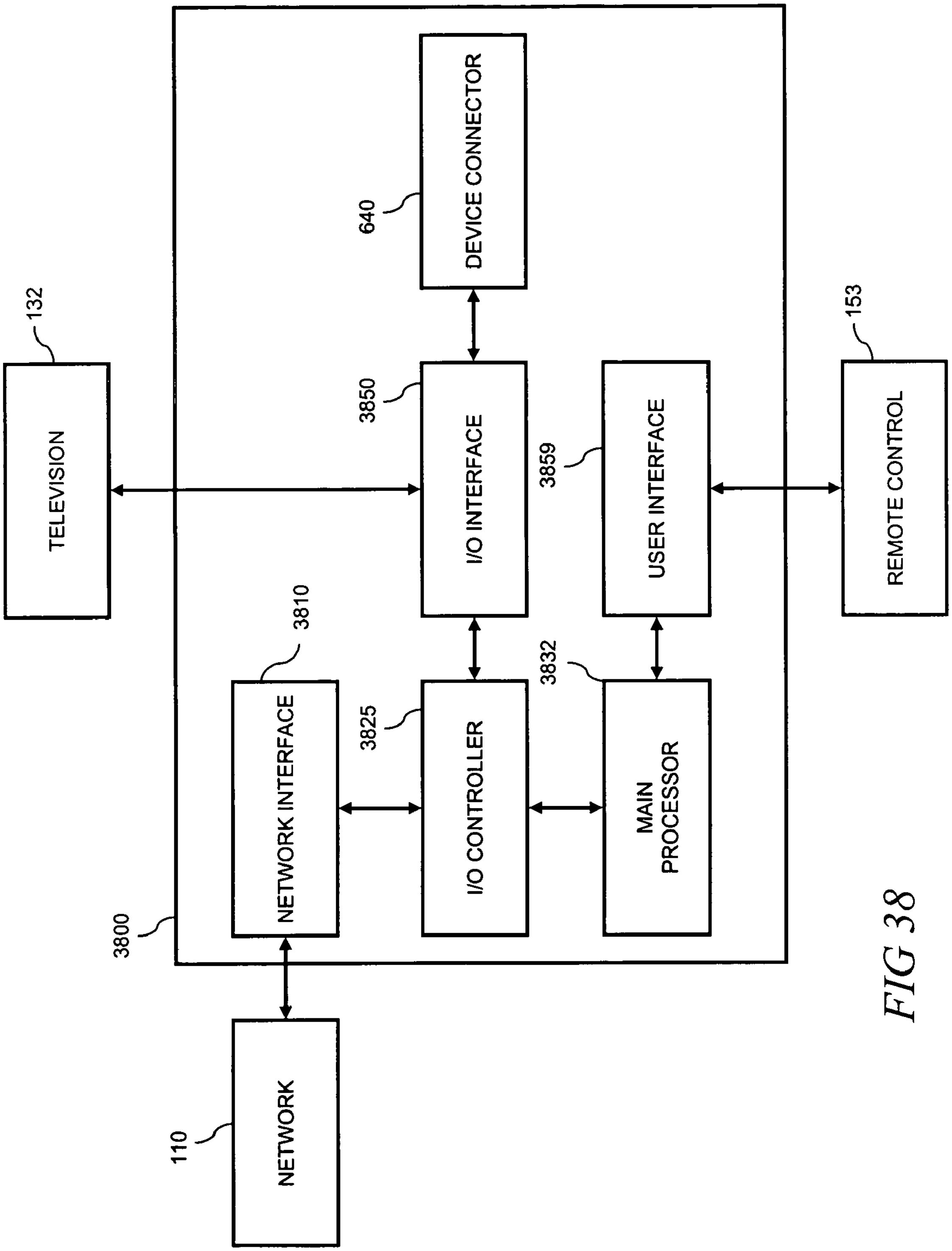
FIG. 38 is a functional block diagram of an illustrative STB.

FIG. 38 is a functional block diagram for an illustrative STB 3800. STB 3800 is coupled to a network 110 in a manner similar to that shown in FIG. 1 and described in the accompanying text. A network interface 3810 receives media content and EPG data from network 110 and supplies it to an I/O controller 3825 that is coupled to the STB's main processor 3832. Typically, STBs employ an I/O controller that is separate from the main processor. However, in some applications a single, general purpose processor performs and manages all functions in the STB.

An I/O interface 3850 is coupled to the I/O controller 3825 and transmits signals between the physical connector 640 and the I/O controller 3825 (In some applications it may be desirable to couple the connector 640 directly to I/O controller 3825 without using I/O interface 3850). Main processor 3832 is coupled to a user interface 3859 which is coupled to send and receive signals between the STB and a remote control 153 (FIG. 1). I/O interface 3850 is also coupled to television 132 (FIG. 1) to display an EPG on the television 132 using, for example, the menus shown in FIGS. 35-37.

Figure 39:
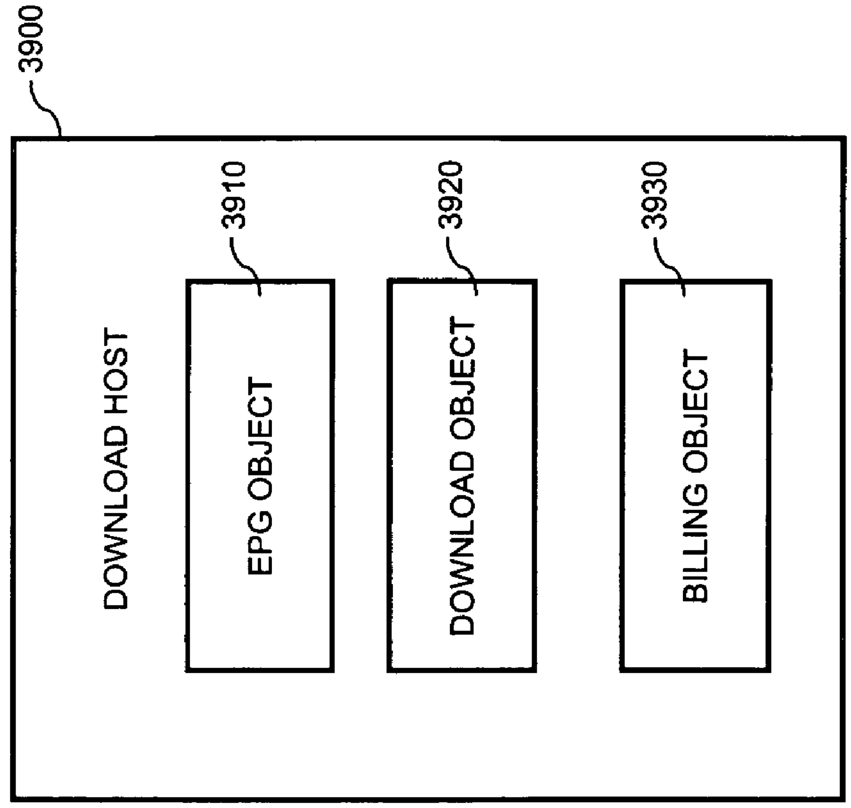
FIG. 39 is a block diagram of a download host application that is arranged to run on a STB.

FIG. 39 is a block diagram of a download host application 3900 that is arranged to run on a STB. Applications like that shown in FIG. 39 are typically run on a STB as middleware or as a high level application. Accordingly, other elements necessary to implement media content downloading to a mobile phone is provided by the STB operating system and/or firmware, or network and head end resources that are not shown nor included in FIG. 39. As shown, the download host application includes three components (i.e., software objects) including an EPG object 3910, a download object 3920 and an optional billing object 3930. The EPG object 3910 composes and renders the EPG on the television including, for example, the menus shown in FIGS. 35-37 using EPG data from an external network. The download object 3920 is utilized to manage the downloading of any media content selected by the user from the menus from the network 110 (FIG. 1). The billing object is optionally utilized to manage any commercial aspects of the downloading process. This may include, for example, user account management, payment for download media content, and the like.

The invention claimed is:

1. A set top box arranged to be coupled to a mobile phone having an accessory connector for transferring media content to the mobile phone, comprising:

a network interface for receiving media content from a network;

a mobile phone receiving bay disposed in a housing of the set top box, the receiving bay including a device connector and a receiving bay opening, the receiving bay opening providing access to the device connector, the device connector being configured for removable engagement with the accessory connector, the device connector and accessory connector providing a communication interface between the set top box and mobile telephone that allows data transmission therethrough when operatively coupled;

an I/O interface coupled to the device connector and configured to transmit the media content to the communication interface; and an adapter configured to substantially conform to the shape of the mobile phone and arranged to be removably disposed within the mobile phone receiving bay.

2. The set top box of claim 1 where the communication interface includes a plurality of different interfaces, the interfaces selected from PS/2, serial, parallel, network, USB and FireWire interfaces.

3. The set top box of claim 1 where the mobile phone receiving bay is configured to receive a bottom end of a mobile phone.

4. The set top box of claim 1 where the mobile phone receiving bay is configured to receive a back side of a mobile phone.

5. The set top box of claim 1 where the mobile phone receiving bay is configured as a standalone device that is operatively coupled to the set top box.

6. The set top box of claim 5 where the operative coupling is implemented using a cable.

* * * * *